US011699166B2

(12) United States Patent
Chan et al.

(10) Patent No.: US 11,699,166 B2
(45) Date of Patent: Jul. 11, 2023

(54) MULTI-MERCHANT LOYALTY POINT PARTNERSHIP

(71) Applicant: American Express Travel Related Services Company, Inc., New York, NY (US)

(72) Inventors: Calvin Chan, Mineloa, NY (US); Christopher Cracchiolo, Old Bridge, NJ (US); Andras Ferenczi, Peoria, AZ (US); Harish R. Naik, Phoenix, AZ (US); Andrew Martin Baal Thomas, Jersey City, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 225 days.

(21) Appl. No.: 16/168,477

(22) Filed: Oct. 23, 2018

(65) Prior Publication Data
US 2019/0108543 A1 Apr. 11, 2019

Related U.S. Application Data

(63) Continuation-in-part of application No. 15/728,086, filed on Oct. 9, 2017, now Pat. No. 11,449,887.

(51) Int. Cl.
*G06Q 30/02* (2023.01)
*H04L 9/06* (2006.01)
(Continued)

(52) U.S. Cl.
CPC ....... *G06Q 30/0229* (2013.01); *H04L 9/0637* (2013.01); *H04L 9/3236* (2013.01);
(Continued)

(58) Field of Classification Search
None
See application file for complete search history.

(56) References Cited

U.S. PATENT DOCUMENTS 9,251,528 B1 * 2/2016 McGhie ................. G06Q 20/06
9,785,912 B2 10/2017 Quezada
(Continued)

FOREIGN PATENT DOCUMENTS

CN   107070644   8/2017
CN   107079036   8/2017
(Continued)

OTHER PUBLICATIONS

PR Newswire Association LLC, "Loylogic and Coinify Partner to Offer First-Order Loyalty Currency Conversion into a Cryptocurrency", PR Newswire Europe including UK Disclose [New York], Aug. 24, 2017. (Year: 2017).*
(Continued)

*Primary Examiner* — Neha Patel
*Assistant Examiner* — Clay C Lee
(74) *Attorney, Agent, or Firm* — Thomas | Horstemeyer, LLP

(57) ABSTRACT

A blockchain-based multi-merchant loyalty point partnership system may include a blockchain API host that receives a request to create a partnership smart contract for a multi-merchant loyalty point partnership. The request may specify various partnership parameters to include in the partnership smart contract. The blockchain API host may create the partnership smart contract and write the partnership smart contract to a blockchain. One or more qualified merchants may join the partnership smart contract to make the partnership active. In response to a customer completing a plurality of purchases that complete the partnership parameters of the partnership smart contract, the system may issue (Continued)

the customer a purchase reward which may include a loyalty point payout.

20 Claims, 13 Drawing Sheets

(51) Int. Cl.
*H04L 9/32* (2006.01)
*G06Q 30/0226* (2023.01)
*H04L 9/00* (2022.01)

(52) U.S. Cl.
CPC .......... *H04L 9/3239* (2013.01); *H04L 9/3247* (2013.01); *H04L 9/3297* (2013.01); *H04L 9/50* (2022.05); *H04L 2209/56* (2013.01)

(56) References Cited

U.S. PATENT DOCUMENTS

| | | | |
|---|---|---|---|
| 11,025,433 B1* | 6/2021 | Griffin | ................ H04L 9/3297 |
| 2002/0178354 A1 | 11/2002 | Ogg | |
| 2003/0014373 A1 | 1/2003 | Perge et al. | |
| 2003/0200144 A1 | 10/2003 | Antonucci et al. | |
| 2006/0259361 A1* | 11/2006 | Barhydt | ............ G06Q 20/3255 |
| | | | 705/14.12 |
| 2014/0108263 A1 | 4/2014 | Ortiz et al. | |
| 2016/0283941 A1 | 9/2016 | Andrade | |
| 2016/0292672 A1 | 10/2016 | Fay et al. | |
| 2016/0342977 A1* | 11/2016 | Lam | ................ G06Q 20/0658 |
| 2016/0379213 A1 | 12/2016 | Isaacson et al. | |
| 2017/0017936 A1 | 1/2017 | Bisikalo et al. | |
| 2017/0140408 A1 | 5/2017 | Wuehler | |
| 2017/0232300 A1* | 8/2017 | Tran | ..................... H04L 67/535 |
| | | | 434/247 |
| 2017/0236143 A1 | 8/2017 | Code | |
| 2017/0279774 A1 | 9/2017 | Booz et al. | |
| 2017/0286951 A1 | 10/2017 | Ignatchenko et al. | |
| 2018/0025442 A1* | 1/2018 | Isaacson | ................ H04L 51/48 |
| | | | 705/26.62 |
| 2018/0064645 A1 | 3/2018 | Greenspoon | |
| 2018/0089645 A1 | 3/2018 | McDonald et al. | |
| 2018/0268401 A1* | 9/2018 | Ortiz | ................ G06Q 20/204 |
| 2018/0293573 A1 | 10/2018 | Ortiz et al. | |
| 2018/0349891 A1 | 12/2018 | Putre et al. | |
| 2019/0073666 A1* | 3/2019 | Ortiz | ................ H04L 9/0637 |
| 2019/0180311 A1 | 6/2019 | Chan et al. | |
| 2019/0306137 A1* | 10/2019 | Isaacson | ............ G06Q 30/0641 |
| 2019/0312877 A1 | 10/2019 | Xie et al. | |

FOREIGN PATENT DOCUMENTS

| | | |
|---|---|---|
| EP | 3454238 | 6/2018 |
| KR | 10-1591244 B1 | 2/2016 |
| KR | 10-2016-0050876 | 5/2016 |
| KR | 10-2016-0050876 A | 5/2016 |
| KR | 10-2016-0095720 | 8/2016 |
| KR | 10-2016-0095720 A | 8/2016 |
| KR | 10-2016-0114749 | 10/2016 |
| KR | 10-2016-0114749 A | 10/2016 |
| KR | 10-2016-0132307 A | 11/2016 |
| WO | 2017/136956 | 8/2017 |
| WO | 20170136956 | 8/2017 |
| WO | 2018064645 | 4/2018 |
| WO | WO-2018186874 A1 * | 10/2018 ......... G06F 16/1837 |

OTHER PUBLICATIONS

International Search Report and Written Opinion dated PCT/US2018/047640.
International Search Report and Written Opinion dated Apr. 24, 2020 for PCT Patent Application No. PCT/US2018/047640.
International Search Report and Written Opinion dated Jun. 13, 2019 in No. PCT/US2019/022798.
International Search Report and Written Opinion dated Jun. 28, 2019 in No. PCT/US2019/26818.
Non-final Office Action dated Sep. 6, 2019 in U.S. Appl. No. 15/728,086.
Sweeney E. (2018) "AmEx Pilots Blockchain-Based Loyalty Rewards with Boxed" Marketingdive Retrieved on Jan. 31, 2020. <https://www.marketingdive.com/news/amex-pilots-blockchain-based-loyalty-rewards-with-boxed/524452/>.

* cited by examiner

MULTI-MERCHANT LOYALTY POINT PARTNERSHIP

CROSS-REFERENCE TO RELATED APPLICATIONS

This application is a continuation-in-part of, and claims priority to, U.S. application Ser. No. 15/728,086 filed on Oct. 9, 2017 and entitled, "SYSTEMS AND METHODS FOR LOYALTY POINT DISTRIBUTION," the contents of which are hereby incorporated by reference in their entirety.

FIELD

This disclosure generally relates to loyalty points, and more particularly, to systems and methods for multi-merchant loyalty point partnerships using a distributed database.

BACKGROUND

Payment networks typically implement various systems for processing transactions between merchants and customers. Merchants are members of the payment network and the merchants are authorized to charge to customer accounts. Customers have a transaction account with the payment network. To complete a transaction, a merchant typically transmits a payment request (or settlement) to the payment network with transaction details and the card member's account information. For payment networks using loyalty points, options for using points are often limited to a few merchants.

Payment networks typically face increased costs and limitations associated with the traditional payment model. The payment network implements secure protocols for handling the payment requests, and such secure protocols along with network infrastructure are costly to develop and maintain. The high network costs also result in high fees charged to merchants using the payment network. Additional programs supported by a payment network such as loyalty points or multi-merchant loyalty point partnerships, for example, further increase costs associated with security and infrastructure.

SUMMARY

Systems, methods, and articles of manufacture (collectively, the "system") for multi-merchant loyalty point partnerships are disclosed. The system may receive a request create a partnership smart contract, wherein the request comprises a partnership parameter. The system may propagate a contract request to consensus participants for writing to a blockchain, wherein the contract request comprises the partnership smart contract, and wherein the partnership smart contract comprises the partnership parameter. The system may transmit a contract write notification to a loyalty portal, wherein in response to receiving the contract write notification the loyalty portal broadcasts a partnership notification to a qualifying participant based on the partnership parameter.

In various embodiments, the system may receive a request for an active partnership smart contract, wherein the request comprises loyalty partner data. The system may retrieve the active partnership smart contract by comparing the partnership parameter of the active partnership smart contract with the loyalty partner data. The system may return the active partnership smart contract to a loyalty partner. The system may receive a partnership enrollment request, wherein the partnership enrollment request comprises loyalty partner data and a partnership smart contract identifier. The system may propagate the partnership enrollment request to the consensus participants for writing to the blockchain, wherein in response to receiving the partnership enrollment request the consensus participants achieve consensus on the partnership enrollment request.

In various embodiments, the system may execute the partnership smart contract in response to being invoked by a first loyalty partner, wherein the first loyalty partner invokes the blockchain API host in response to completing a first transaction with a customer, and wherein in response to being executed the partnership smart contract records the first transaction. The system may propagate a first transaction record write to the consensus participants for writing to the blockchain, wherein in response to receiving the first transaction record write the consensus participants achieve consensus on the first transaction record write. The system may execute the partnership smart contract in response to being invoked by a second loyalty partner, wherein the second loyalty partner invokes the blockchain API host in response to completing a second transaction with the customer, and wherein in response to being executed the partnership smart contract records the second transaction. The system may propagate a second transaction record write to the consensus participants for writing to the blockchain, wherein in response to receiving the second transaction record write the consensus participants achieve consensus on the second transaction record write. In response to being executed the partnership smart contract determines that the first transaction and the second transaction complete the partnership parameter of the partnership smart contract.

In various embodiments, in response to a purchase reward of the partnership smart contract being a loyalty point payout the partnership smart contract instructs blockchain API host to adjust a loyalty account balance of the customer based on the loyalty point payout. The partnership parameter may comprise at least one of a qualifying participant parameter, a purchase requirement parameter, a purchase reward parameter, or a partnership duration parameter.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
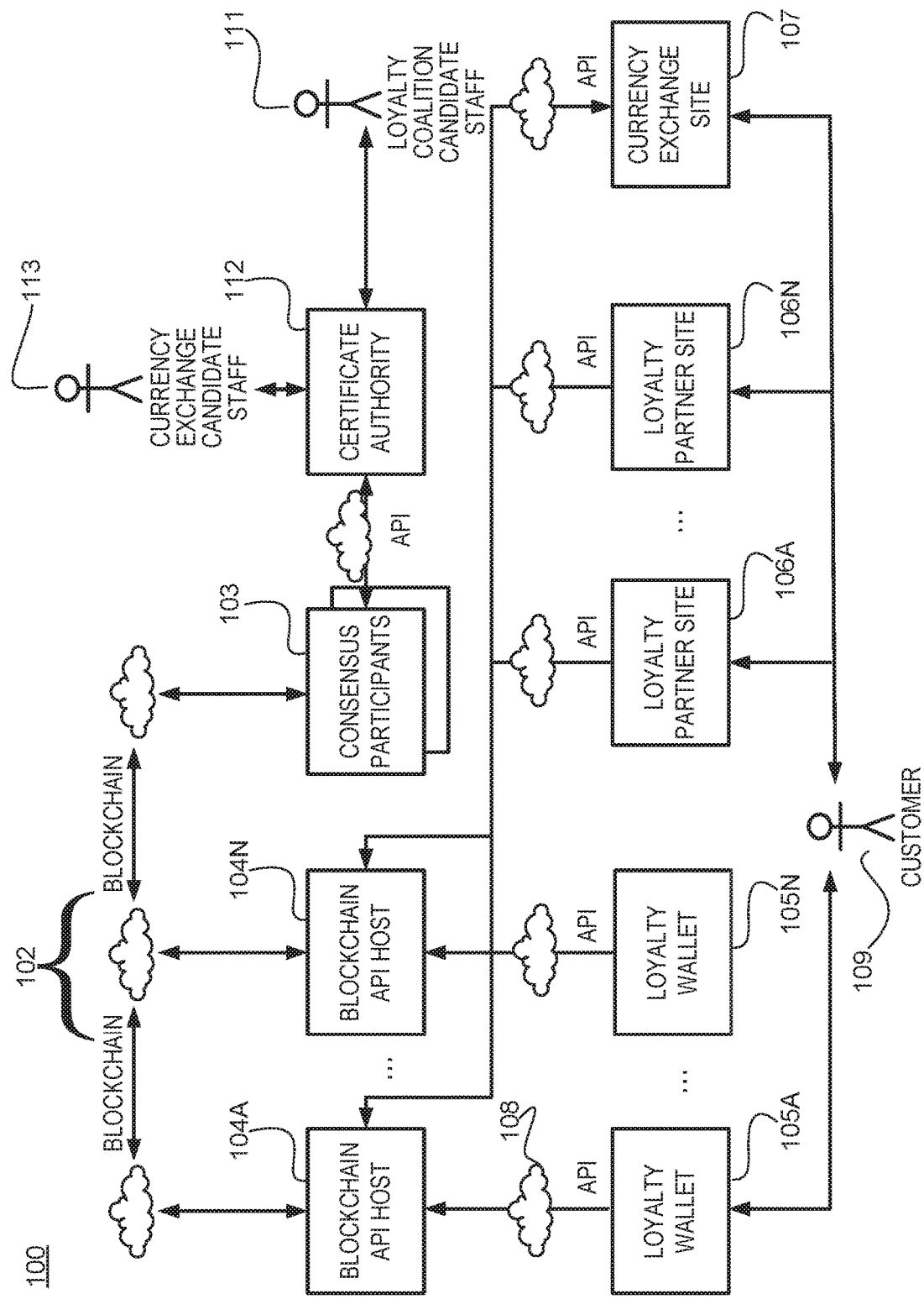
FIG. 1 illustrates a loyalty point or digital currency system configured to operate on a public, private, or semi-private ledger maintained on a blockchain, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

A payment network based on peer-to-peer payments may be used to facilitate most functions of traditional card payment networks and to enable additional services and functionality. For example, a blockchain driven peer-to-peer payment network enables near-instant transaction authorization and settlement. Payment, authorization, and/or settlement on such a network may result in money changing hands in an hour, 10 minutes, a minute, or less depending on the infrastructure used to implement the payment network. For a blockchain-based peer-to-peer payment network, a governing organization or consortium may control access to bank transfer services. Anyone can participate in the payment network, but in various embodiments, only users that registered with the managing organization(s) may transfer earned credits into fiat currency via wire transfers to bank accounts. The blockchain may autonomously manage workflows associated with payment processing as described in greater herein.

The payment networks use a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain.

The payment networks may also implement smart contracts that enforce data workflows in a decentralized manner. For example, such payment networks may enable digital currency smart contracts that enforce business workflows in a decentralized manner and keep track of account balances. The payment networks may also enable reputation based smart contracts that act as a directory of trustworthy entities as part of the payment network.

A digital currency issuer may be included in the payment network and may be configured to transfer balances between external banks and digital currency based wallets vie electronic funds transfer (EFT) systems. The digital currency issuer may also connect customers with lenders to convert lines of credit into digital currencies. The payment network may also include digital wallet services deployed on user devices such as, for example, computers, tablets, smartphones, Internet of Things devices (IoT devices), etc. The digital wallet services may enable payments by interacting with the smart contracts and the blockchain underpinning the payment network.

FIG. 1 depicts a loyalty point network 100 that operates on a blockchain 102, in accordance with various embodiments. Loyalty point network 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

Blockchain 102 may be a distributed database that maintains records in a readable manner and that is resistant to tampering. Blockchain 102 may be based on blockchain technologies such as, for example, ETHEREUM®, Open Chain, Chain Open Standard, HYPERLEDGER® Fabric, CORDA CONNECT®, INTEL® Sawtooth, etc. Blockchain 102 may comprise a ledger of interconnected blocks containing data. Each block may link to the previous block and may include a timestamp. The blocks can hold file transfer data, smart contract data, and/or other information as desired. Each block may link to the previous block and may include a timestamp. Blockchain 102 may be maintained on various blockchain nodes (e.g., consensus participants 103), and may be maintained in the form of copies or partial copies of the blockchain 102, as discussed further herein. Blocks may be written to blockchain 102 by establishing consensus between the blockchain nodes. For example, consensus may be established based on proof of work, proof of stake, practical byzantine fault tolerance, delegated proof of stake, or other suitable consensus algorithms. When implemented in support of loyalty point network 100, the blockchain may serve as an immutable log for loyalty point transactions and registrations.

blockchain 102 may be maintained in a peer-to-peer network that is private, consortium and/or public in nature (ETHEREUM®, HYPERLEDGER® Fabric, etc.). Consortium and private networks may offer improved control over the content of the blockchain and public networks may leverage the cumulative computing power of the network to improve security. In that regard, blockchain 102 may be implemented using technologies such as, for example, ETHEREUM® GETH, eth-lightwallet, or other suitable or future blockchain interface technologies.

In various embodiments, blockchain 102 may be maintained by consensus participants 103 in the form of computing devices configured to validate blocks of the blockchain. Loyalty point network 100 comprises a plurality of blockchain API hosts 104 that communicate with blockchain 102 in response to receiving API calls from various other computing devices and systems seeking to read from or write to blockchain 102. Blockchain API hosts 104 and other computing devices described herein may take the form of a computer or processor, or a set of computers, processor, and/or application specific integrated circuits (ASICs), although other types of computing units or systems may be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), interne of things (IoT) devices, or any other device capable of receiving data over a network. Each computing device may run applications to interact with blockchain 102, communicate with other devices, perform crypto operations, and otherwise operate within loyalty point network 100. For example, each computing device may run a client application that can be a thin client (web), a hybrid (e.g., web and native, such as APPLE® iOS and ANDROID®), or a native application to make application programming interface (API) calls to blockchain API host 104 and interact with blockchain 102, such as a web3 API compatible with blockchain databases maintained by ETHEREUM®.

In various embodiments, blockchain API hosts 104 may host an outward facing API 108 accessible by communication over a network such as, for example, a LAN, a WAN, the internet, and/or any other suitable type of network discussed herein.

In various embodiments, API 108 may serve as a blockchain interface accessible by applications and computing devices of loyalty point network 100. API 108 may be implemented using technologies such as, for example, ETHEREUM® GETH, eth-lightwallet, or other suitable blockchain interface technologies. Loyalty wallets 105 may communicate with blockchain API host 104 using API 108. Loyalty wallet 105 may check loyalty point balances, adjust loyalty point balances, transfer loyalty points, register a user or device, or otherwise manipulate loyalty points as allowed by loyalty point network 100. Loyalty wallet 105A, for example, may run on a mobile device to enable customer 109 to interact with blockchain 102 and his or her loyalty points.

In various embodiments, merchants that accept loyalty points from loyalty point network 100 as a form of payment may host loyalty partner sites 106 on computing devices. Customer 109 may browse or search loyalty partner site 106 for items in a manner similar to typical ecommerce sites. Once customer 109 has selected items for purchase, customer 109 may purchase the items using loyalty points. Loyalty partner sites 106 may thus communicate with blockchain 102 through blockchain API host 104 using API 108 to complete purchase transactions using loyalty points.

In various embodiments, currency exchange sites 107 may exchange loyalty points from customer 109 into fiat currency. Currency exchange sites may include web sites hosted on computing devices remote from customer 109 and/or brick and mortar locations such as currency exchange stores. Currency exchange sites 107 may communicate with blockchain 102 through blockchain API host 104 using API 108.

In various embodiments, loyalty point network 100 may include controls to restrict access to registered loyalty partner sites 106 and/or currency exchange sites 107. Certificate authority 112 may allow participants to join loyalty point network 100 or may disallow would-be participants from joining loyalty point network 100. Certificate authority may communicate with blockchain 102 through consensus participants 103 of blockchain 102 using an API 108. Certificate authority 112 may include a web interface for review of new currency exchange sites by currency exchange candidate staff 113. Similarly, certificate authority 112 may include a web interface for review of new loyalty partner sites by loyalty coalition candidate staff 111. The staff members may thus approve or deny candidates for joining loyalty point network 100. Validation may include verifying of proof of identity such as, for example, phone number, employer ID, SSN, or any sensitive information that known by the employees of the respective entity.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the nodes may be accomplished through any suitable communication channels, such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

Referring now to FIGS. 2-9 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-9, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Figure 2:
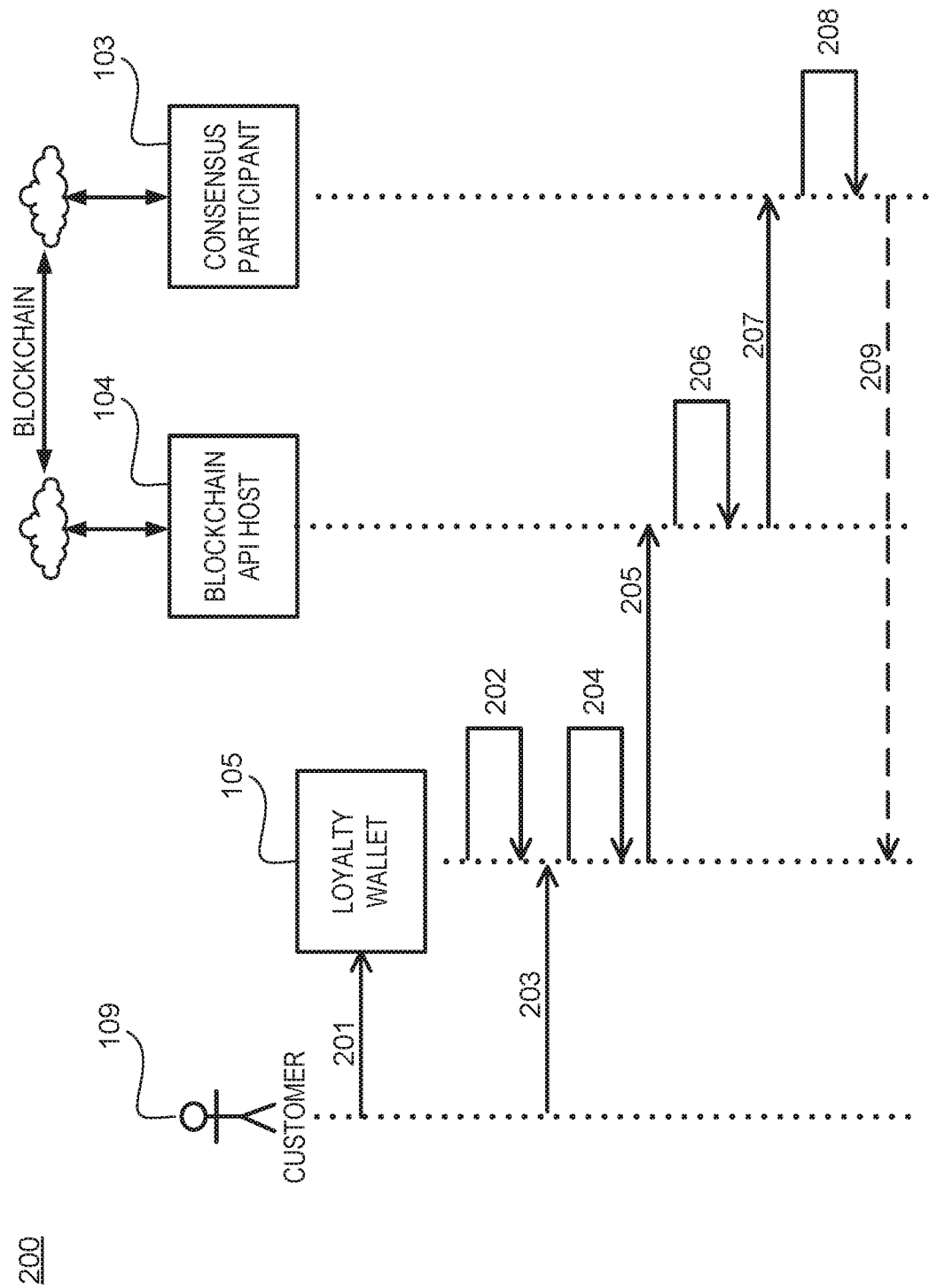
FIG. 2 illustrates a process for registering users for a payment network for loyalty points using a blockchain-based ledger, in accordance with various embodiments.

Referring to FIG. 2, an exemplary registration process 200 is shown for loyalty point network 100, in accordance with various embodiments. Customer 109 may download and install a loyalty wallet 105 on his or her mobile device (Step 201). Loyalty wallet 105 may be in electronic communication with blockchain API host 104 over a network. Loyalty wallet 105 may generate and/or receive an asymmetric cryptography key pair including a private key paired with a public key (Step 202). Loyalty wallet 105 may display a mnemonic seed and password selection screen to customer 109, and it may use BIP32, BIP39, BIP44, or another key generation technique to create public keys (e.g., blockchain addresses) and private keys, which may be encrypted and stored locally on the customer's computing device.

In various embodiments, loyalty wallet 105 may encrypt the private key and securely store the private key for later use. Loyalty wallet 105 may also collect personal information from customer 109 (Step 203). A registration form may, for example, include fields for customer 109 to enter a user name and enter a password. Customer 109 may enter user credentials comprising a user ID, password, and any other information entered into the registration form of loyalty wallet 105.

In various embodiments, loyalty wallet 105 may prepare and sign a registration request for transmission to a blockchain API host 104 (Step 204). The registration request may include the personal information of customer 109 (collected in step 203), the public key (generated in step 202), an application ID, a device ID, an account number, or other information germane to registration. In that regard, the blockchain address may be associated with the customer's loyalty point account. The signature may be a crypto operation performed with the private key from the asymmetric key pair (generated in step 202). Loyalty wallet 105 may transmit the registration request to blockchain API host 104

(Step 205). Loyalty wallet 105 may make an API call to transmit the registration request.

In various embodiments, blockchain API host 104 may verify the signature and prepare a proposal to register customer 109 (Step 206). Blockchain API host 104 may verify the signature by performing a crypto operation using the public key to the data that was signed using the private key. Blockchain API host 104 may propagate the registration proposal to consensus participants 103 (Step 207). Blockchain API host 104 may propagate the registration proposal by writing it to the blockchain or by otherwise transmitting the proposal to consensus participants 103. Consensus participants 103 may achieve consensus and add a new ledger for customer 109 to blockchain 102 (Step 208). Consensus participants 103 may validate registrations, loyalty point transactions, and any other activity on blockchain 102 by establishing consensus between the participants based on proof of work, proof of stake, practical byzantine fault tolerance, delegated proof of stake, or other suitable consensus algorithms. Consensus participants 103 may notify loyalty wallet 105 of successful registration by transmitting a confirmation, or by loyalty wallet locating the registration written on blockchain 102 (Step 209).

Figure 3:
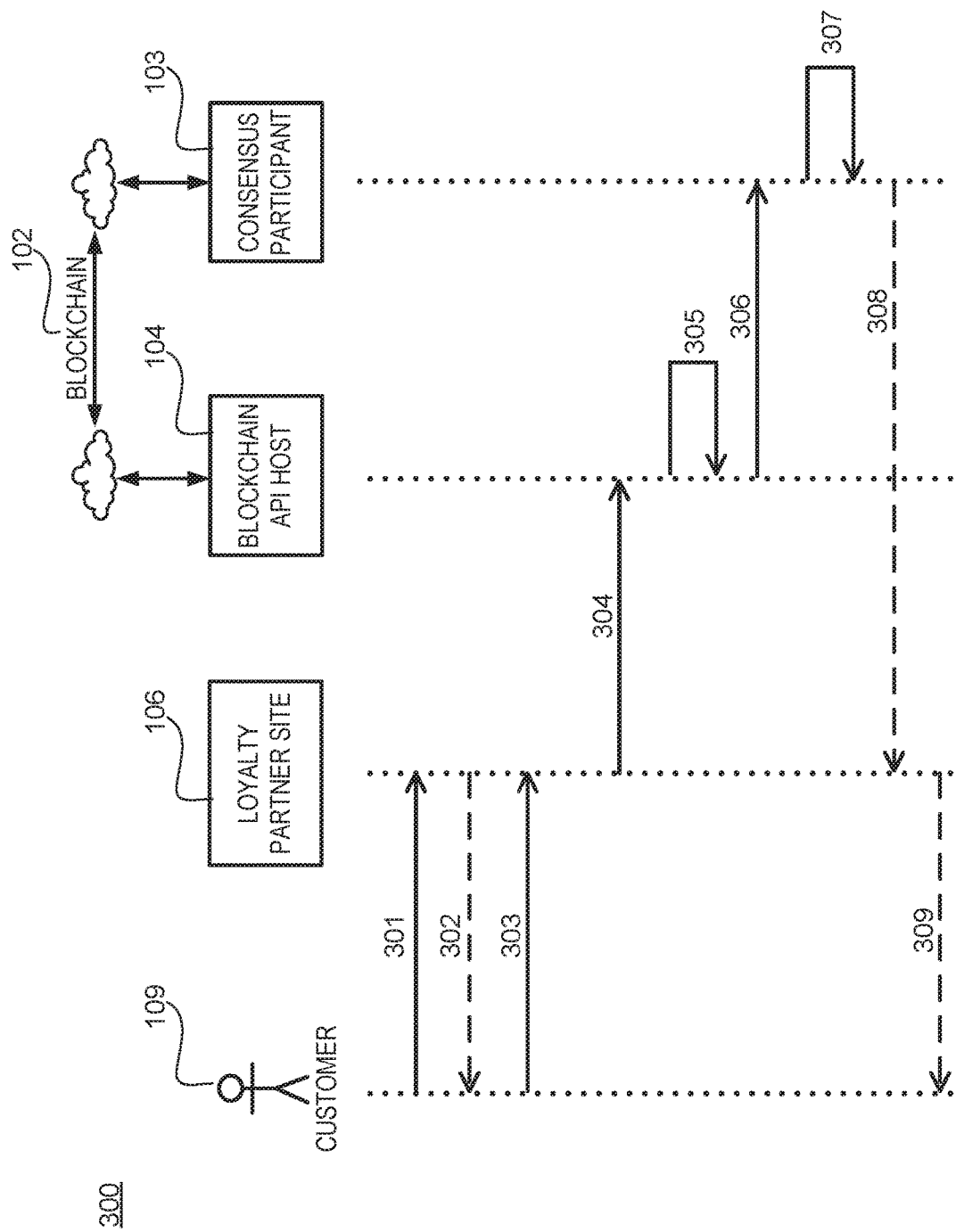
FIG. 3 illustrates a process for shopping for loyalty point purchases on a website hosted by a merchant that accepts loyalty points as payment, in accordance with various embodiments.

With reference to FIG. 3, process 300 is shown for shopping for on loyalty point network 100, in accordance with various embodiments. Customer 109 shops with a loyalty partner by browsing loyalty partner site 106 (Step 301). Loyalty partner site 106 may prompt customer 109 and/or loyalty wallet 105 for the corresponding loyalty account at checkout (Step 302). The loyalty account may be identifiable by a universally unique identifier (UUID), for example. Customer 109 may provide the loyalty account (Step 303) in response to the prompt by entering the loyalty account and/or by loyalty wallet 105 transmitting the loyalty account.

In various embodiments, loyalty partner site 106 may transmit a point adjustment request to blockchain API host 104 (Step 304) using an API call. Blockchain API host 104 may execute a smart contract (Step 305) in response to receiving the API request to adjust a point balance. Blockchain API host 104 may also send adjustment request to the network of consensus participants 103 (Step 306). Consensus participants 103 may achieve consensus and thus new entry to blockchain 102 (Step 307). Consensus participants 103 may notify loyalty partner site 106 (Step 308) of the completed balance adjustment. Consensus participants 103 may also notify customer 109 (Step 309) of the completed balance adjustment.

Figure 4:
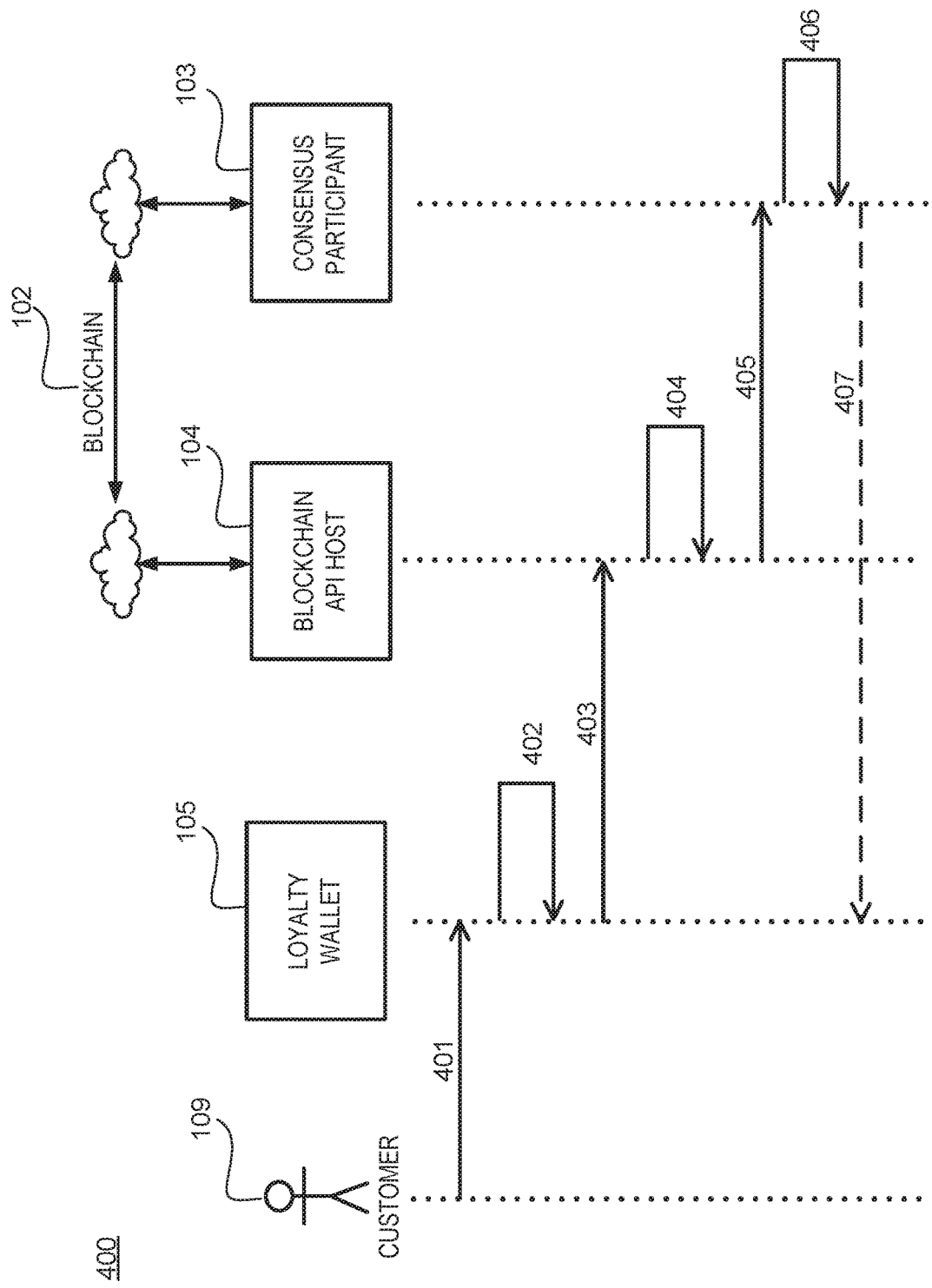
FIG. 4 illustrates a process for checking a loyalty point balance on a blockchain-based ledger, in accordance with various embodiments.

With reference to FIG. 4, a process 400 is shown for checking a loyalty point balance in loyalty point network 100, in accordance with various embodiments. Customer 109 request his or her loyalty point balance in loyalty wallet 105 (Step 401). Loyalty wallet 105 may prepare and/or sign the request (Step 402). Loyalty wallet 105 may sign the request by performing a crypto operation with a private key from an asymmetric cryptographic key pair as described above. Loyalty wallet 105 may transmit the signed request to blockchain API host 104 (Step 403).

In various embodiments, blockchain API host 104 may validate the signature and prepare a proposal to inquire point balance (Step 404). Blockchain API host 104 may validate the signature by performing a cryptographic operation using the public key on the data what was encrypted by loyalty wallet 105 using the corresponding private key. Blockchain API host 104 may prepare the proposal by preparing data for writing to a block of the blockchain including, for example, an identifier of the customer (e.g., the public key or blockchain address), the transaction (e.g., a balance inquiry), the requesting party, a timestamp, or any other data for inclusion in the blockchain.

In various embodiments, blockchain API host 104 may propagate the proposal to consensus participants 103 by transmitting the proposal and/or writing the proposal to blockchain 102 (Step 405). Consensus participants 103 may achieve consensus and add the proposal to the blockchain 102 (Step 406). The consensus participants 103 and/or blockchain API host 104 may notify customer 109 by writing to blockchain 102 and/or transmitting a confirmation and/or a balance to loyalty wallet 105 (Step 407).

Figure 5:
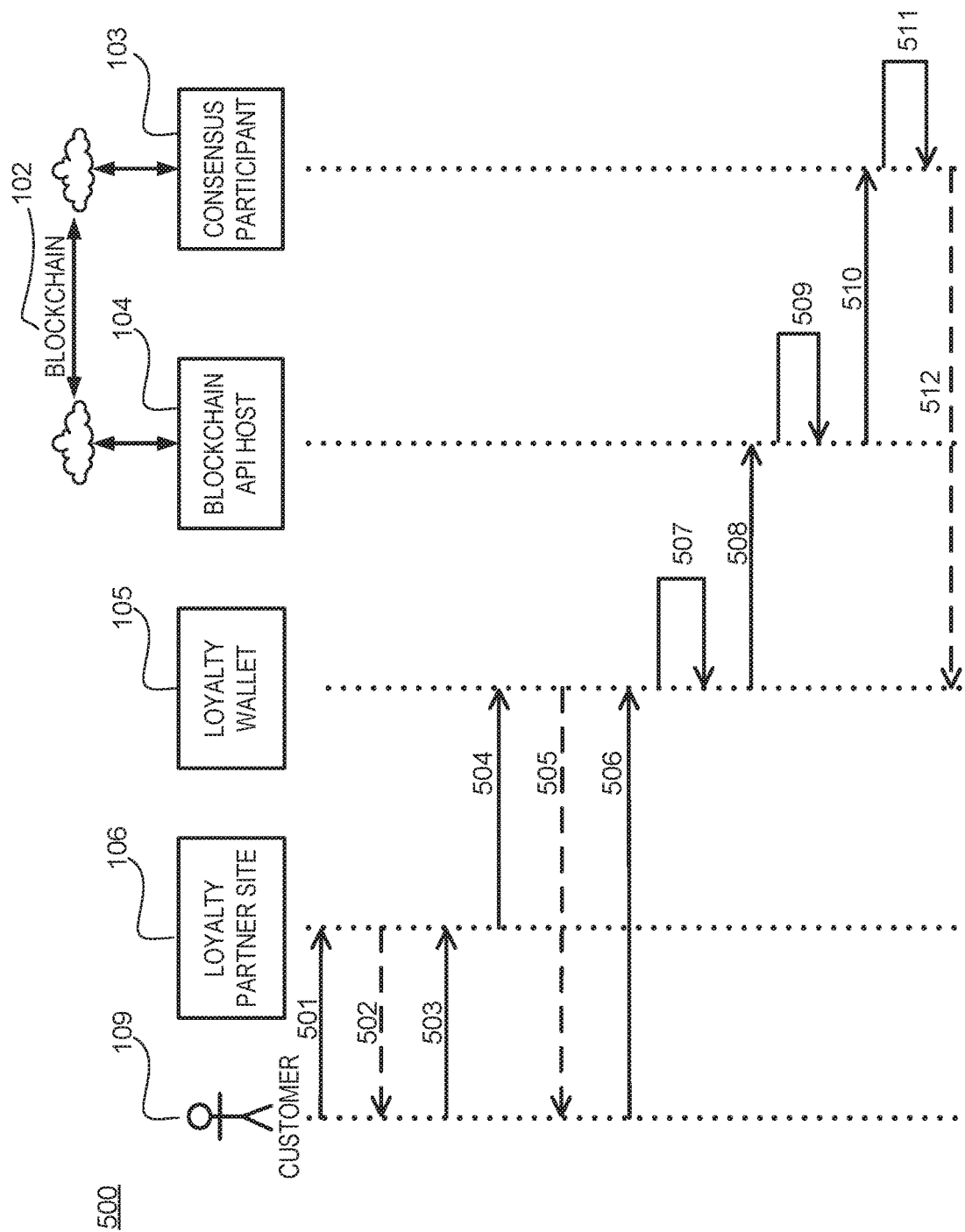
FIG. 5 illustrates a process for a user to spend their loyalty points, in accordance with various embodiments.

Referring now to FIG. 5, a process 500 is shown for spending loyalty points with a loyalty partner site 106 of loyalty point network 100, in accordance with various embodiments. Customer 109 may shop on a loyalty partner site 106 using a website or native application (Step 501). Loyalty partner site 106 may host a checkout page (Step 502). The checkout page may offer various payment methods such as credit, ACH, gift cards, and loyalty points, for example. Customer 109 may select loyalty points as a payment method on loyalty partner site 106 (Step 503).

In response to the selection of loyalty points as a payment method, a computing device may open loyalty wallet 105 installed on the computing device by a deep link (Step 504). A deep link allows a first application running on a computing device to launch a second application installed on the computing device and/or pass data from the first application to the second application. For example, web browsers running on mobile devices often launch an application store to facilitate installation of a particular application on the mobile device. Here, the deep link triggered by selecting points as a payment method may launch loyalty wallet 105 and send as parameters the merchant blockchain account (e.g., the merchant's public key) and the amount of purchase.

In various embodiments, the computing device may prompt for a security password to access loyalty wallet 105 (Step 505), and the computing device may receive and/or authenticate the password from customer 109 (Step 506). The password may be in the form of a pin, passcode, password, biometric identifier, one-time password, or other data suitable for authenticating customer 109. Loyalty wallet 105 may decrypt the private key stored on the computing device and sign a request to pay loyalty partner site 106 using loyalty points (Step 507). The request may include the data passed to loyalty wallet 105 by the deep link in response to loyalty partner site 106 launching loyalty wallet 105. For example, the request may include the merchant's blockchain address and the amount of purchase.

In various embodiments, loyalty wallet 105 may send the payment request to blockchain API host 104 (Step 508). Blockchain API host 104 may validate the signature in response to receiving the request by performing a cryptographic operation using the public key on the data that was encrypted by loyalty wallet 105 using the corresponding private key. Blockchain API host 104 may prepare the proposal by preparing data for writing to a block of the blockchain including, for example, the customer's blockchain address (e.g., the public key), the transaction (e.g., a payment), a transaction amount, the merchant's blockchain address, a timestamp, or any other data for inclusion in the blockchain.

In various embodiments, blockchain API host 104 may propagate the proposal to consensus participants 103 by transmitting the proposal and/or writing the proposal to blockchain 102 (Step 510). Consensus participants 103 may achieve consensus and add the proposal to the blockchain 102 (Step 511). The consensus participants 103 and/or blockchain API host 104 may thus notify customer 109 by writing data from the proposal to blockchain 102 and/or transmitting a confirmation to loyalty wallet 105 (Step 512). Once written to the blockchain, the data from the proposal updates the account balance for customer 109 by removing the amount of loyalty points spent with loyalty partner site 106.

Figure 6:
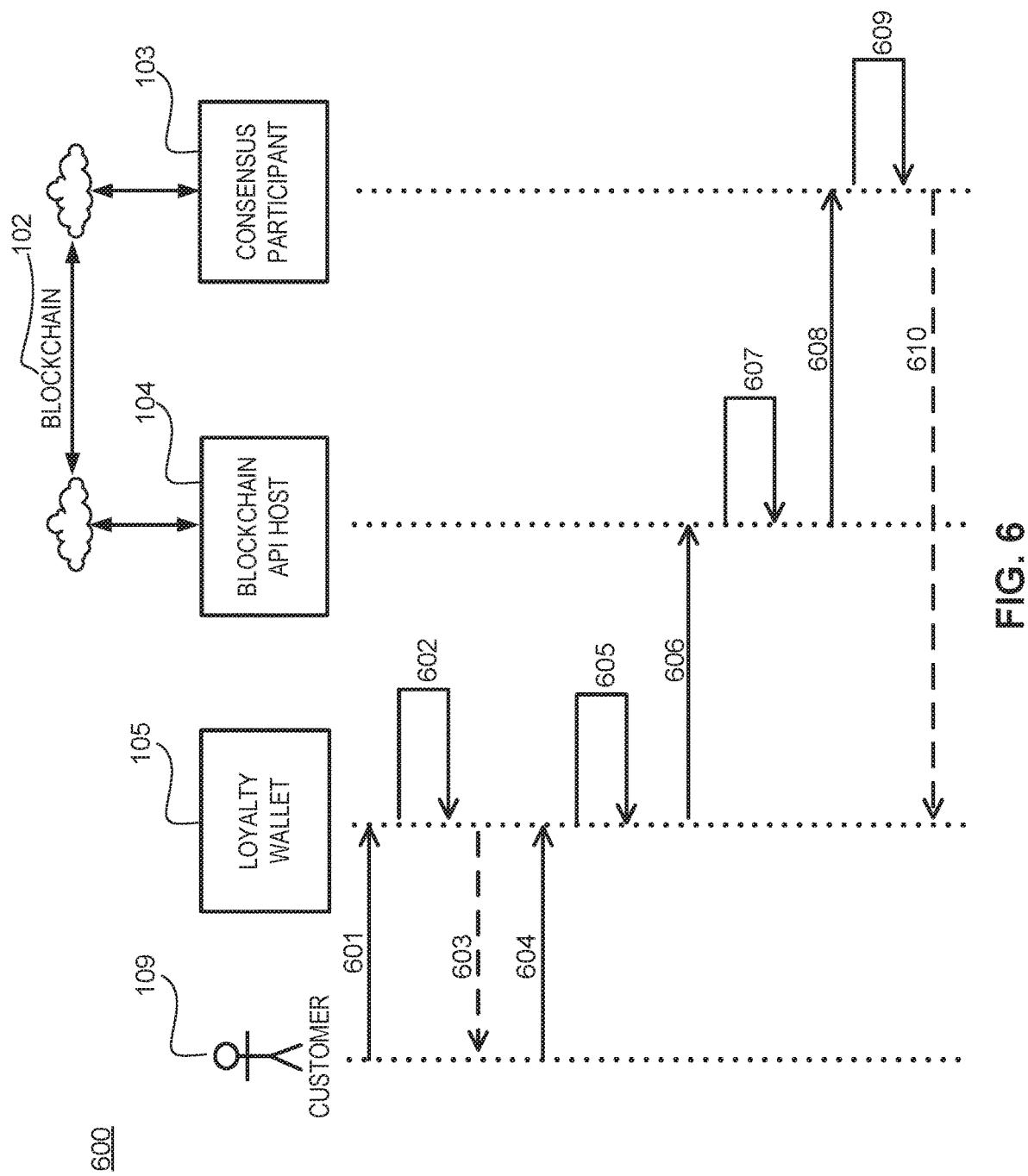
FIG. 6 illustrates a process for peer-to-peer loyalty point transfer using a blockchain-based leger, in accordance with various embodiments.

With reference to FIG. 6, a process 600 is shown for peer-to-peer transfer of loyalty points in loyalty point network 100, in accordance with various embodiments. Customer 109 may request a peers' account (Step 601). The account may be sent to the customer via a message or email, for example, and may come in the form of the peer's public key, UUID, and/or blockchain address. Loyalty wallet 105 may fetch the peer's address (Step 602). For example, loyalty wallet 105 may scan a communication channel to identify the account, may allow customer 109 to enter the account, or may communicate with a loyalty wallet belonging to the peer to receive the account.

In various embodiments, loyalty wallet 105 running on the customer's computing device may prompt customer 109 for a security password (Step 603), and the computing device may receive and/or authenticate the password from customer 109 (Step 604). The password may be in the form of a pin, passcode, password, biometric identifier, one-time password, or other data suitable for authenticating customer 109. Loyalty wallet 105 may decrypt the private key stored on the computing device and sign a request to transfer loyalty points to the peer's account (Step 605). The request may include, for example, the peer's account and the amount of points for transfer to the peer.

In various embodiments, loyalty wallet 105 may send the transfer request to blockchain API host 104 (Step 606). Blockchain API host 104 may validate the signature and prepare a proposal in response to receiving the request (Step 607). Blockchain API host 104 may validate the signature by performing a cryptographic operation using the public key on the data that was encrypted by loyalty wallet 105 using the corresponding private key. Blockchain API host 104 may also prepare a transfer proposal by preparing data for writing to a block of the blockchain with the data including, for example, the customer's blockchain address (e.g., the public key), the transaction (e.g., a transfer), the peer's account (e.g., blockchain address), a timestamp, the transfer amount, or any other data for inclusion in the blockchain.

In various embodiments, blockchain API host 104 may propagate the proposal to consensus participants 103 by transmitting the proposal and/or writing the proposal to blockchain 102 (Step 608). Consensus participants 103 may achieve consensus and add the proposal to the blockchain 102 (Step 609). The consensus participants 103 and/or blockchain API host 104 may thus notify customer 109 by writing data from the proposal to blockchain 102 and/or transmitting a confirmation to loyalty wallet 105 (Step 610). Once written to the blockchain, the data from the proposal updates the account balances for customer 109 and the peer by transferring the requested amount of loyalty points from the customer's account to the peer's account.

Figure 7:
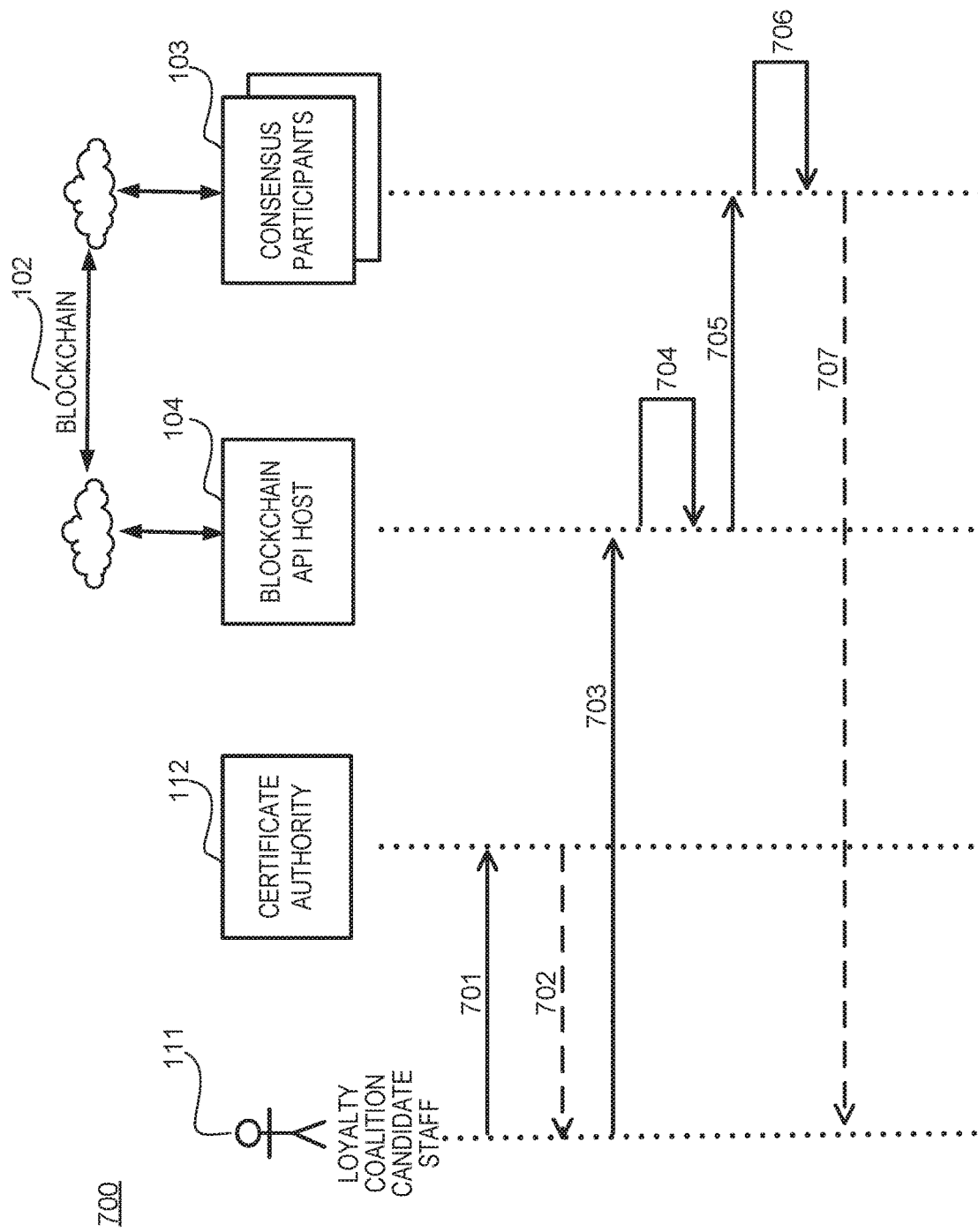
FIG. 7 illustrates a process for adding a loyalty coalition member to a blockchain-based loyalty point system, in accordance with various embodiments.

With reference to FIG. 7, process 700 is shown for adding a loyalty coalition member such as a new loyalty partner, in accordance with various embodiments. The candidate staff 111 may register an entity with certificate authority 112 (Step 701). Certificate authority 112 may respond by providing certificates and/or private keys to the loyalty coalition candidate staff 111 (Step 702). Loyalty coalition candidate staff may prepare a request to add the entity as a new coalition member, sign the request, and transmit the request to blockchain API host 104 (Step 703). The request may be signed by performing a cryptographic operation on all or part of the request using the private key received from the certificate authority 112.

In various embodiments, blockchain API host 104 may verify the signature by performing a cryptographic operation on the signed data using the public key corresponding to the entity's private key (Step 704). Blockchain API host 104 may also prepare a proposal to add the entity to loyalty point network 100. Blockchain API host 104 may propagate the proposal to consensus participants 103 by transmitting the proposal and/or writing the proposal to blockchain 102 (Step 705). Consensus participants 103 may achieve consensus and add the proposal to the blockchain 102 (Step 706). The consensus participants 103 and/or blockchain API host 104 may thus notify loyalty coalition candidate staff 111 by writing data from the proposal to blockchain 102 and/or transmitting a confirmation to loyalty wallet 105 (Step 707). Once written to the blockchain, the data from the proposal adds the entity to the loyalty payment network of network 100.

Figure 8:
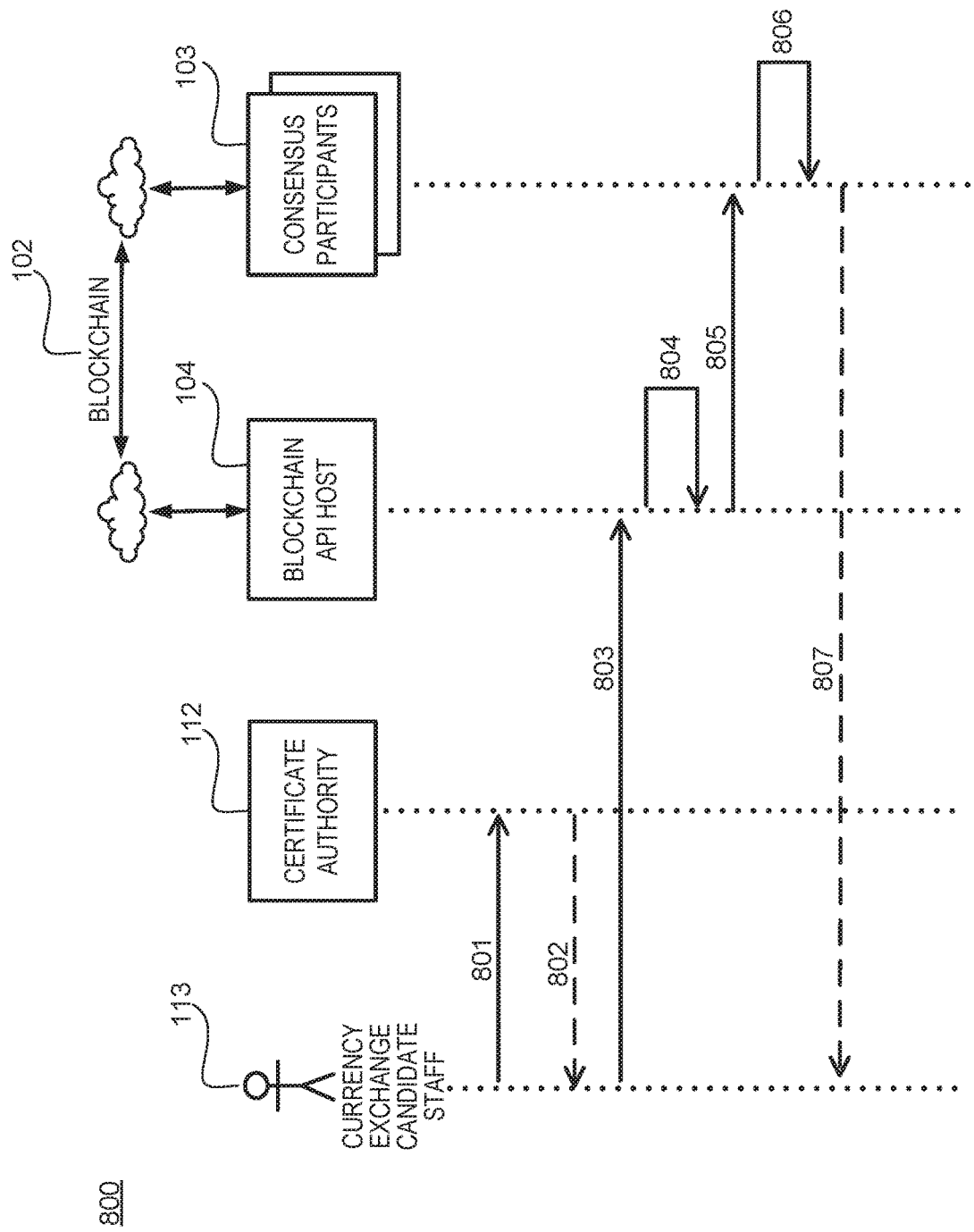
FIG. 8 illustrates a process for adding a currency exchange to a blockchain-based loyalty point system, in accordance with various embodiments.

With reference to FIG. 8, a process 800 for adding a currency exchange to loyalty point network 100 is shown, in accordance with various embodiments. The candidate staff 113 working on behalf of the registering entity may register an entity with certificate authority 112 (Step 801). Certificate authority 112 may respond by providing certificates and/or private keys to the currency exchange candidate staff 113 (Step 802). Currency exchange candidate staff 113 may prepare a request to add the entity as a currency exchange, sign the request, and transmit the request to blockchain API host 104 (Step 803). The request may be signed by performing a cryptographic operation on all or part of the request using the private key received from the certificate authority 112.

In various embodiments, blockchain API host 104 may verify the signature by performing a cryptographic operation on the signed data using the public key corresponding to the entity's private key (Step 804). Blockchain API host 104 may also prepare a proposal to add the entity to loyalty point network 100 as a currency exchange. Blockchain API host 104 may propagate the proposal to consensus participants 103 by transmitting the proposal and/or writing the proposal to blockchain 102 (Step 805). Consensus participants 103 may achieve consensus and add the proposal to the blockchain 102 (Step 806). The consensus participants 103 and/or blockchain API host 104 may thus notify currency exchange candidate staff 113 by writing data from the proposal to blockchain 102 and/or transmitting a confirmation to loyalty wallet 105 (Step 807). Once written to the blockchain, the data from the proposal adds the entity to the loyalty payment network of network 100 as a currency exchange.

Figure 9:
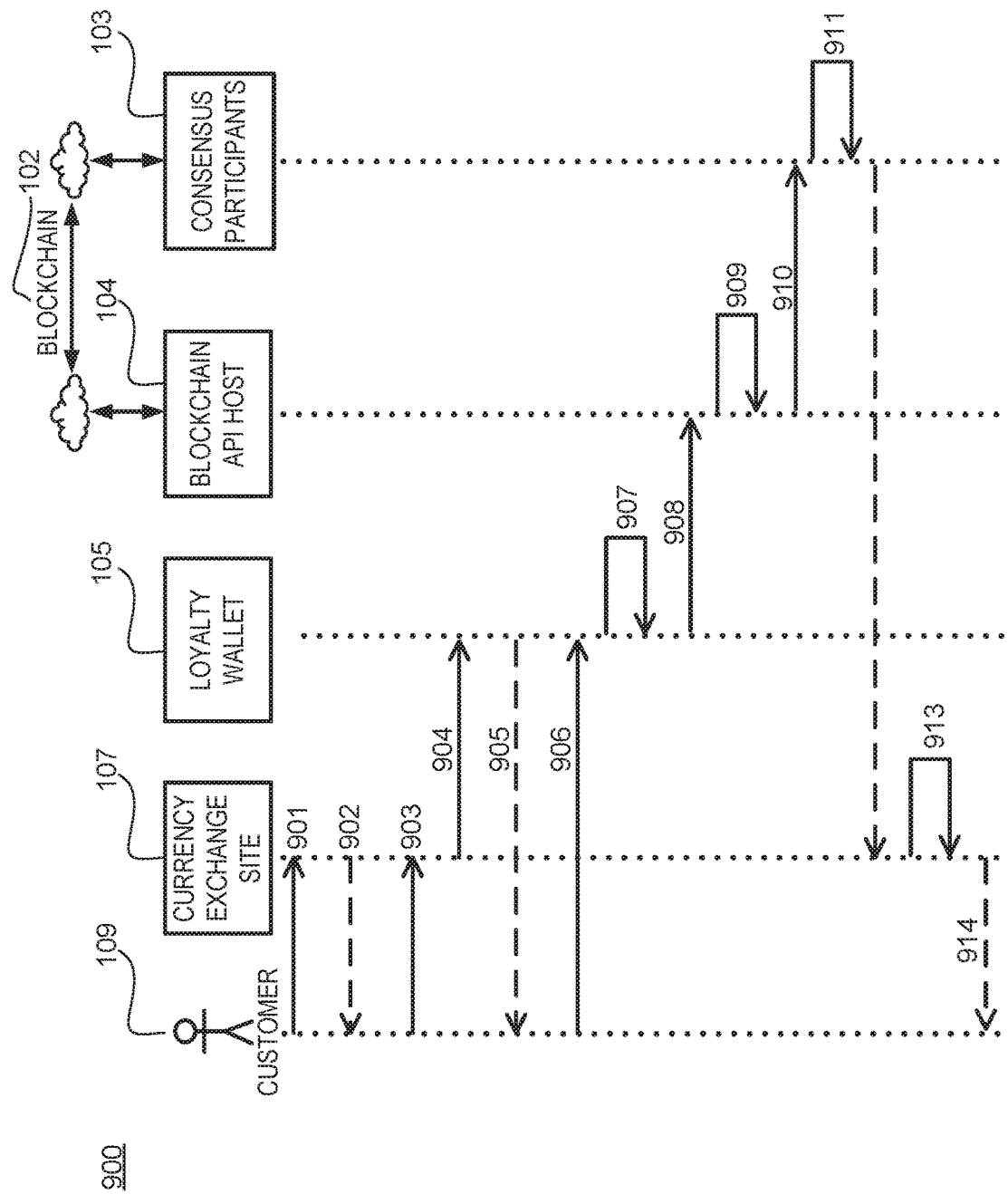
FIG. 9 illustrates a process for exchanging loyalty points for fiat currency, in accordance with various embodiments.

Referring now to FIG. 9, a process 900 is shown for exchanging loyalty points for fiat currency in loyalty point network 100, in accordance with various embodiments. Customer 109 accesses on a currency exchange site 107 using a website or native application to request a currency exchange rate (Step 901). Currency exchange site 107 may provide exchange rates from loyalty points into one or more fiat currencies and/or from fiat currencies into loyalty points (Step 902). Customer 109 may provide to currency exchange site 107 exchange information in requesting the currency exchange (Step 903). The exchange information may include destination account for the fiat currency, ACH details, currency type, currency amount, or other data.

In response to the request for a currency exchange, a computing device may open loyalty wallet 105 installed on the computing device by a deep link (Step 904). The deep link triggered by requesting a currency exchange from points to fiat currency may launch loyalty wallet 105 and send as parameters the requested fiat currency type, the requested fiat currency amount, the amount of loyalty points to exchange, and/or the account of the currency exchange (e.g., the exchange's public key, UUID).

In various embodiments, the computing device may prompt for a security password to access loyalty wallet 105 (Step 905), and the computing device may receive and/or authenticate the password from customer 109 (Step 906). The password may be in the form of a pin, passcode, password, biometric identifier, one-time password, or other data suitable for authenticating customer 109. Loyalty wallet 105 may decrypt the private key stored on the computing device and sign a request to exchange currency with currency exchange site 107 (Step 907). The request may include the data passed to loyalty wallet 105 by the deep link in response to currency exchange site 107 launching loyalty wallet 105. For example, the request may include the exchange's account, the amount of loyalty points to exchange, and the fiat currency type.

In various embodiments, loyalty wallet 105 may send the exchange request to blockchain API host 104 (Step 908). Blockchain API host 104 may validate the signature in response to receiving the request by performing a cryptographic operation using the public key on the data that was encrypted by loyalty wallet 105 using the corresponding private key (Step 909). Blockchain API host 104 may prepare the proposal by preparing data for writing to a block of the blockchain including, for example, the customer's blockchain address (e.g., the public key), the transaction (e.g., a currency exchange), an exchange amount, the merchant's blockchain address, a timestamp, or any other data for inclusion in the blockchain.

In various embodiments, blockchain API host 104 may propagate the proposal to consensus participants 103 by transmitting the proposal and/or writing the proposal to blockchain 102 (Step 910). Consensus participants 103 may achieve consensus and add the proposal to the blockchain 102 (Step 911). The consensus participants 103 and/or blockchain API host 104 may thus notify the currency exchange by writing data from the proposal to blockchain 102 and/or transmitting a confirmation to currency exchange site 107 (Step 912). Once written to the blockchain, the data from the proposal updates the account balance for customer 109 by removing the amount of loyalty points exchanged with currency exchange site 107. The currency exchange may credit the bank account identified to currency exchange site 107 with the fiat currency amount (Step 913). The currency exchange may use an ACH transfer to credit customer 109 with the account and transfer information entered by customer 109 (in Step 903). Currency exchange site 107 may notify loyalty wallet 105 in response to completion of the exchange (Step 914). The notification may take the form of a text message, email, or push notification, for example.

Figure 10:
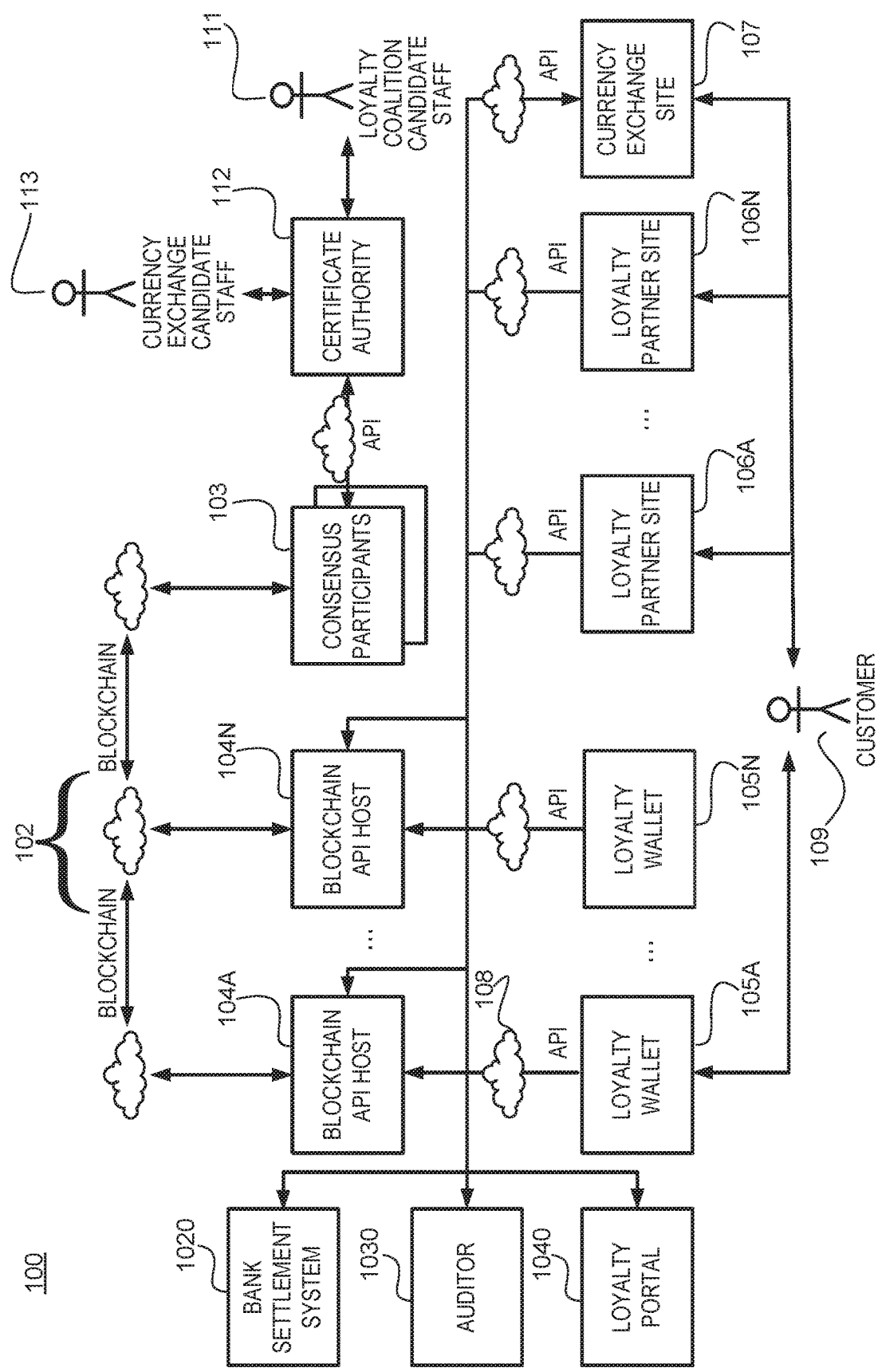
FIG. 10 illustrates a illustrates a loyalty point or digital currency system configured to for multi-merchant loyalty point partnerships, in accordance with various embodiments.

In various embodiments, and with reference to FIG. 10, loyalty point network 100 may also be configured to facilitate multi-merchant loyalty point partnerships. Merchants (e.g., loyalty partners) may desire to create partnerships with one or more other merchants to incentivize customers 109 to purchase goods or services at each merchant joined in the partnership. For example, merchants in a common industry (e.g., hotel, airline, etc.) may form a partnership to incentivize customers to purchase from one or more merchants in the industry. Loyalty point network 100 may incentivize partner merchants and/or customers 109 by providing a partnership reward, such as a loyalty point payout, in response to customer 109 purchasing goods or services at each merchant, in accordance with the partnership.

The loyalty point network 100 may enable SKU-level based rewards bonusing with merchant partners, partner discounts and/or the loyalty partner credits by rewarding partners, merchants and/or customers 109. In response to customer 109 conducting a purchase transaction for goods or services at a merchant, the merchant may acquire a bar code, UPC and/or SKU from the product or packaging. The UPC and/or SKU may be in the form of a bar code, data, QR code or other code or symbol. The UPC and/or SKU may be scanned by the merchant POS to acquire the data from the product. The UPC and/or SKU may include data about the product, the merchant, the manufacturer, contents, health data, etc. Such data (or any subset of such data) may be used to determine a loyalty point amount or payout to customer 109 and/or to a merchant. For example, the SKU data may disclose that the customer purchased 3 Wilson tennis rackets. The manufacturer Wilson or the merchant selling the product (or any other entity in the supply chain) may agree to provide or fund a certain amount of reward points (for the partner, merchant and/or customer) based on buying 2 or more Wilson tennis rackets during a certain timeframe or for a certain price, etc. For more information about SKU based rewards, see U.S. Pat. Nos. 8,065,182, 8,024,220, 7,813,955, 7,672,870, 7,613,628, 7,496,524, 7,428,498, 7,398,226 and 7,398,225, which all are hereby incorporated by reference in their entirety for all purposes.

For example, travel merchants may desire to create partnerships centered around a travel package (e.g., purchase a flight from merchant A, a hotel from merchant B, a dinner at merchant C, a rental car from merchant D, etc.). As discussed further herein, a merchant may invoke a smart contract and may specify one or more merchants, or desired characteristics of partner merchants, to form a partnership. The smart contract may set forth the purchase requirements at each merchant, a partnership duration (e.g., a day, a week, a month, etc.), parameters for the loyalty point payout or reward, and any other desired parameter. In response to a customer 109 completing at least a portion of the purchase requirements at each merchant (or a subset of the merchants), customer 109 may receive at least a portion of the loyalty point payout or other reward. Customer 109 may redeem the loyalty points at various loyalty partner sites 106, or may exchange the loyalty points into a fiat or cryptocurrency, as previously discussed.

In various embodiments, loyalty point network 100 may comprise a loyalty portal 1040. Loyalty portal 1040 may be configured to enable merchants to create and/or join various multi-merchant loyalty point partnerships, as discussed further herein. Loyalty portal 1040 may comprise software, a mobile application, a web interface, or the like. Loyalty portal 1040 may be accessible to loyalty partners directly via a graphical user interface ("GUI") in a web browser, native application, or the like. Loyalty portal 1040 may include one or more software modules, logic engines, various databases, interfaces to systems and tools, and/or computer networks. In various embodiments, loyalty portal 1040 may be integrated into, or be in electronic communication with, one or more social media platforms (e.g., FACEBOOK®, INSTAGRAM®, LINKEDIN®, PINTEREST®, QZONE®, SNAPCHAT®, TWITTER®, VKontakte (VK), etc.). For example, each merchant may input one or more social media account identifiers (e.g., username and password) into loyalty portal 1040 to enable access and communication between loyalty portal 1040 and the social media platform. In that respect, and as discussed further herein, merchants may interact with each other via the one or more social media platforms to form multi-merchant partnerships, as discussed further herein.

Loyalty portal 1040 may comprise a local contract repository. The local contract repository may comprise any suitable database, data structure, file, or the like configured to store and maintain various partnership smart contract templates. In that regard, one or more loyalty partners may access loyalty portal 1040 to retrieve partnership smart contract templates. The loyalty partner may input various partnership parameters into the partnership smart contract template, as discussed further herein, to generate a partnership smart contract. The partnership smart contract may control the end-to-end data flow in loyalty point network 100 and may autonomously govern the multi-merchant loyalty point partnership by supporting execution and recording of various data, as discussed further herein. The partnership smart contract may comprise executables that write data to blockchain 102 in a predetermined format based on predetermined function parameters passed by an API call or the like, as discussed further herein. For example, the partnership smart contract may include a program written in a programming language such as, for example, Solidity, or any other suitable smart contract programming language.

Loyalty portal 1040 may comprise a local partner repository. The local partner repository may comprise any suitable database, data, structure, file, or the like configured to store and maintain data regarding loyalty partners participating in multi-merchant partnerships (e.g., participant data). The participant data may comprise data corresponding to each local partner, including partner characteristics, partner preferences, or the like. For example, partner characteristics may comprise the partner identifier, the partner industry category, the partner industry subcategory, a partner reputation, the partner history, the partner geographic, the partner goods or services sold, or the like. The partner preferences may comprise data regarding partnerships the loyalty partner desires to join, such as, for example, the type of purchase reward (e.g., partner discount, loyalty point payout, loyalty partner credit, etc.), the partnership duration, the purchase amount, or the like. The participant data may be grouped by each partner identifier in the local partner repository.

In various embodiments, loyalty portal 1040 may also comprise a reputation ledger. The reputation ledger may comprise any suitable database, data, structure, file, or the like configured to store and maintain reputation data regarding one or more loyalty partners. The reputation data may be generated based on merchant reviews, customer reviews, or the like, and may comprise a reputation score having any suitable scale. In that respect, merchants may access loyalty portal 1040 and may review or rate one or more other merchants in loyalty point network 100. In various embodiments, the reputation ledger may also be stored and maintained on blockchain 102, using any suitable technique discussed herein.

In various embodiments, loyalty point network 100 may comprise a bank settlement system 1020. Bank settlement system 1020 may be configured to authorize and settle various transactions in loyalty point network 100. Bank settlement system 1020 may comprise any suitable combination of hardware, software, and/or database components. For example, bank settlement system 1020 may comprise one or more network environments, servers, computer-based systems, processors, databases, and/or the like. Bank settlement system 1020 may comprise at least one computing device in the form of a computer or processor, or a set of computers and/or processors, although other types of computing units or systems may be used, such as, for example, a server, web server, pooled servers, or the like. Bank settlement system 1020 may also include one or more data centers, cloud storages, or the like, and may include software, such as APIs, configured to perform various operations discussed herein.

In various embodiments, bank settlement system 1020 may comprise or interact with a traditional payment network or transaction network to facilitate purchases and payments, authorize transactions, settle transactions, and the like. For example, bank settlement system 1020 may represent existing proprietary networks that presently accommodate transactions for credit cards, debit cards, and/or other types of transaction accounts or transaction instruments. Bank settlement system 1020 may be a closed network that is secure from eavesdroppers. In various embodiments, bank settlement system 1020 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network, transaction network, or the like. Bank settlement system 1020 may include systems and databases related to financial and/or transactional systems and processes, such as, for example, one or more authorization engines, authentication engines and databases, settlement engines and databases, accounts receivable systems and databases, accounts payable systems and databases, and/or the like. In various embodiments, bank settlement system 1020 may also comprise a transaction account issuer's Credit Authorization System ("CAS") capable of authorizing transactions, as discussed further herein.

Although the present disclosure makes reference to bank settlement system 1020, it should be understood that principles of the present disclosure may be applied to a system having any suitable number of bank settlement systems, issuer systems, payment networks, or the like. For example, loyalty point network 100 may comprise one or more bank settlement system 1020 each corresponding to or associated with a different issuer system or network.

In various embodiments, loyalty point network 100 may comprise an auditor 1030. Auditor 1030 may comprise any suitable combination of hardware, software, and/or database components. For example, auditor 1030 may comprise one or more network environments, servers, computer-based systems, processors, databases, and/or the like. In various embodiments, auditor 1030 may be computer based, and may comprise a processor, a tangible non-transitory computer-readable memory, and/or a network interface, along with other suitable system software and hardware components. Instructions stored on the tangible non-transitory memory may allow auditor 1030 to perform various functions, as described herein. The processor may include any logic device such as one or more of a central processing unit (CPU), an accelerated processing unit (APU), a digital signal processor (DSP), a field programmable gate array (FPGA), an application specific integrated circuit (ASIC), or the like.

Auditor 1030 may comprise software, a mobile application, a web interface, or the like. For example, auditor 1030 may include a graphical user interface ("GUI"), software modules, logic engines, interfaces to systems and tools, and/or the like. Auditor 1030 may be configured to enable one or more third parties, systems, or the like access to loyalty point network 100 to review and audit the multi-merchant partnerships, loyalty point distributions, and the like. For example, auditor 1030 may be granted read-only access to any desired amount of transactions in loyalty point network 100, as well as current balances (e.g., loyalty partner balances, user balances, etc.) and the state of relationships between loyalty partners.

Figure 11:
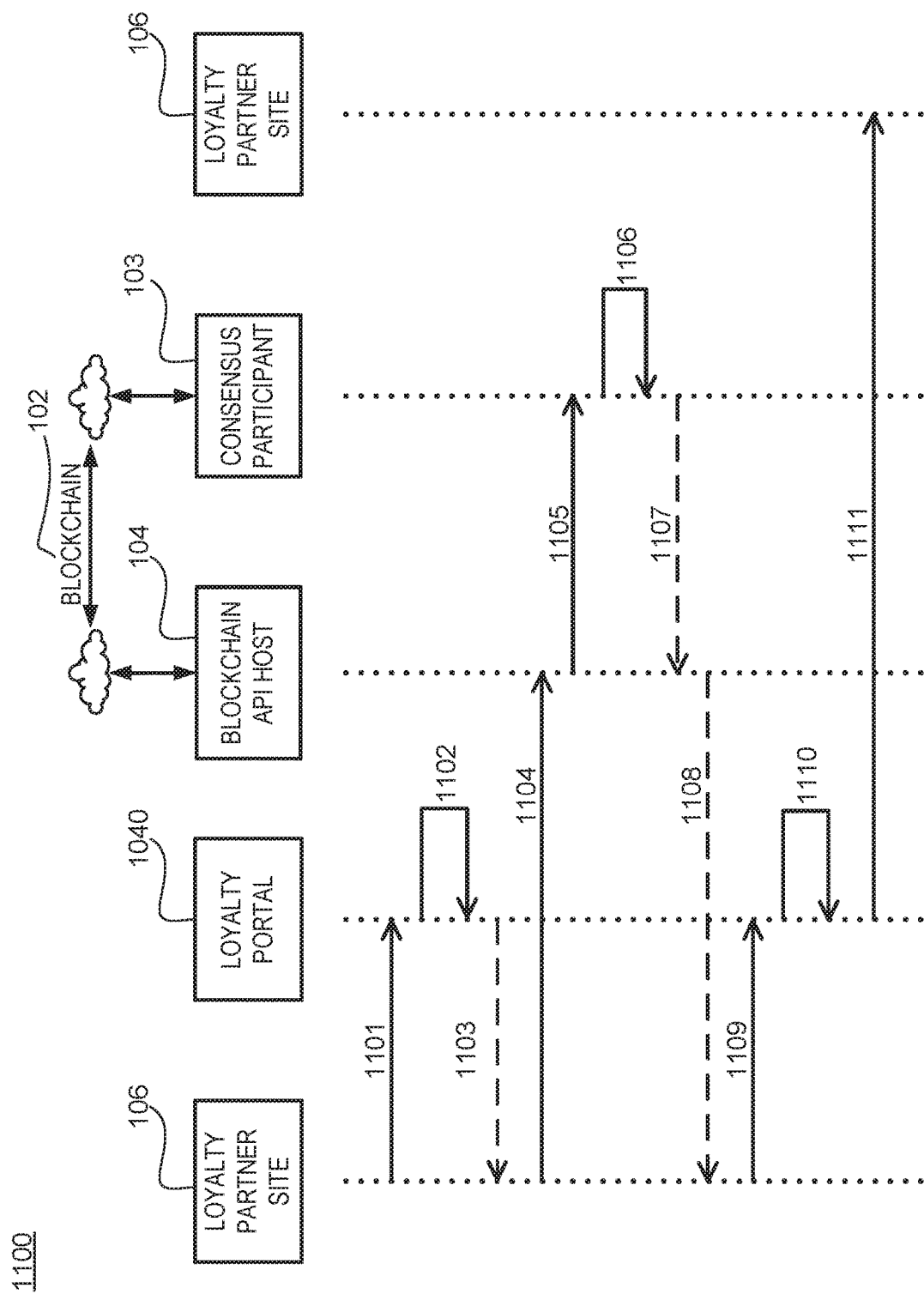
FIG. 11 illustrates a process for generating a multi-merchant loyalty point partnership construct, in accordance with various embodiments.
Figure 12:
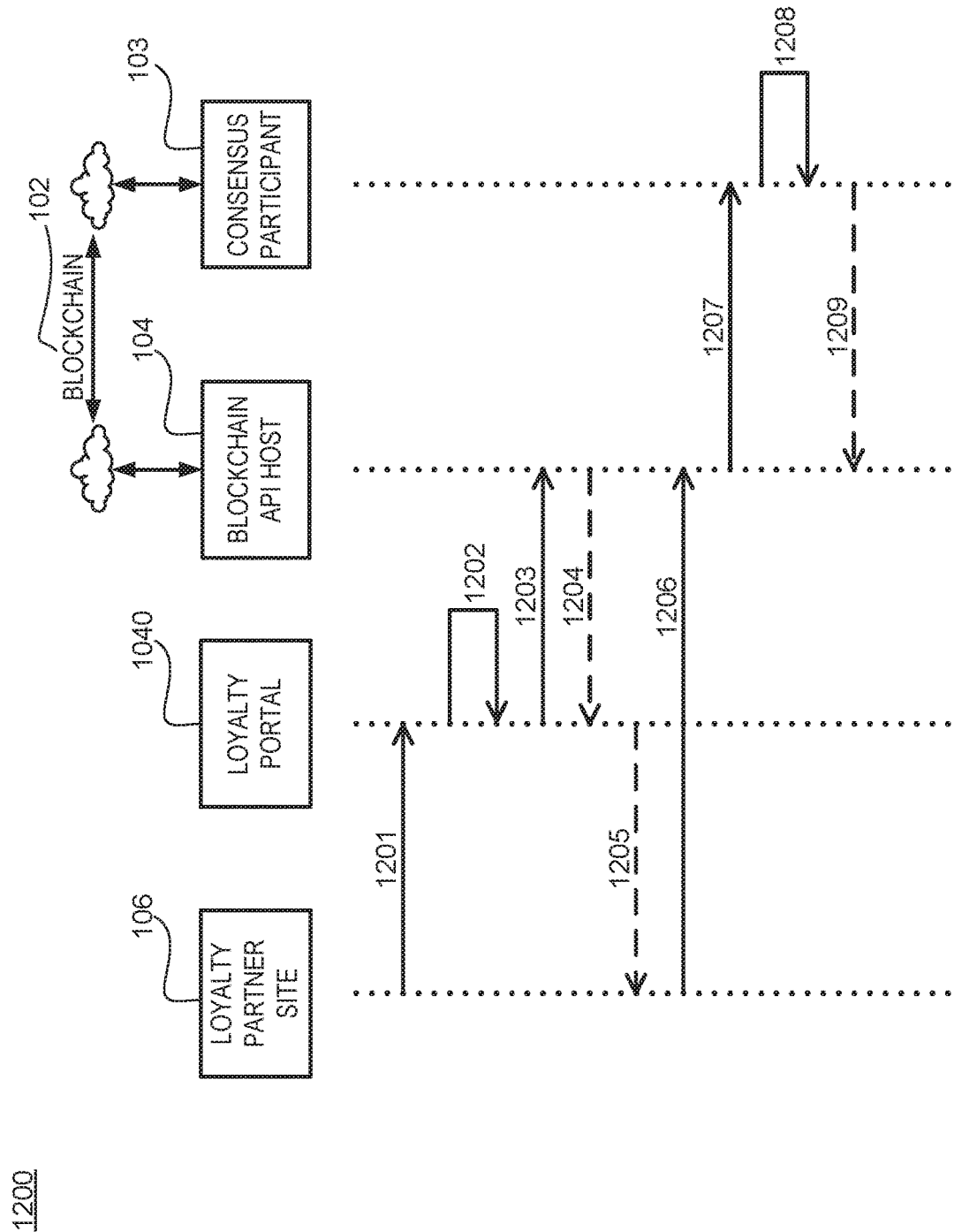
FIG. 12 illustrates a process for enrolling a partner in a multi-merchant loyalty point partnership, in accordance with various embodiments.
Figure 13:
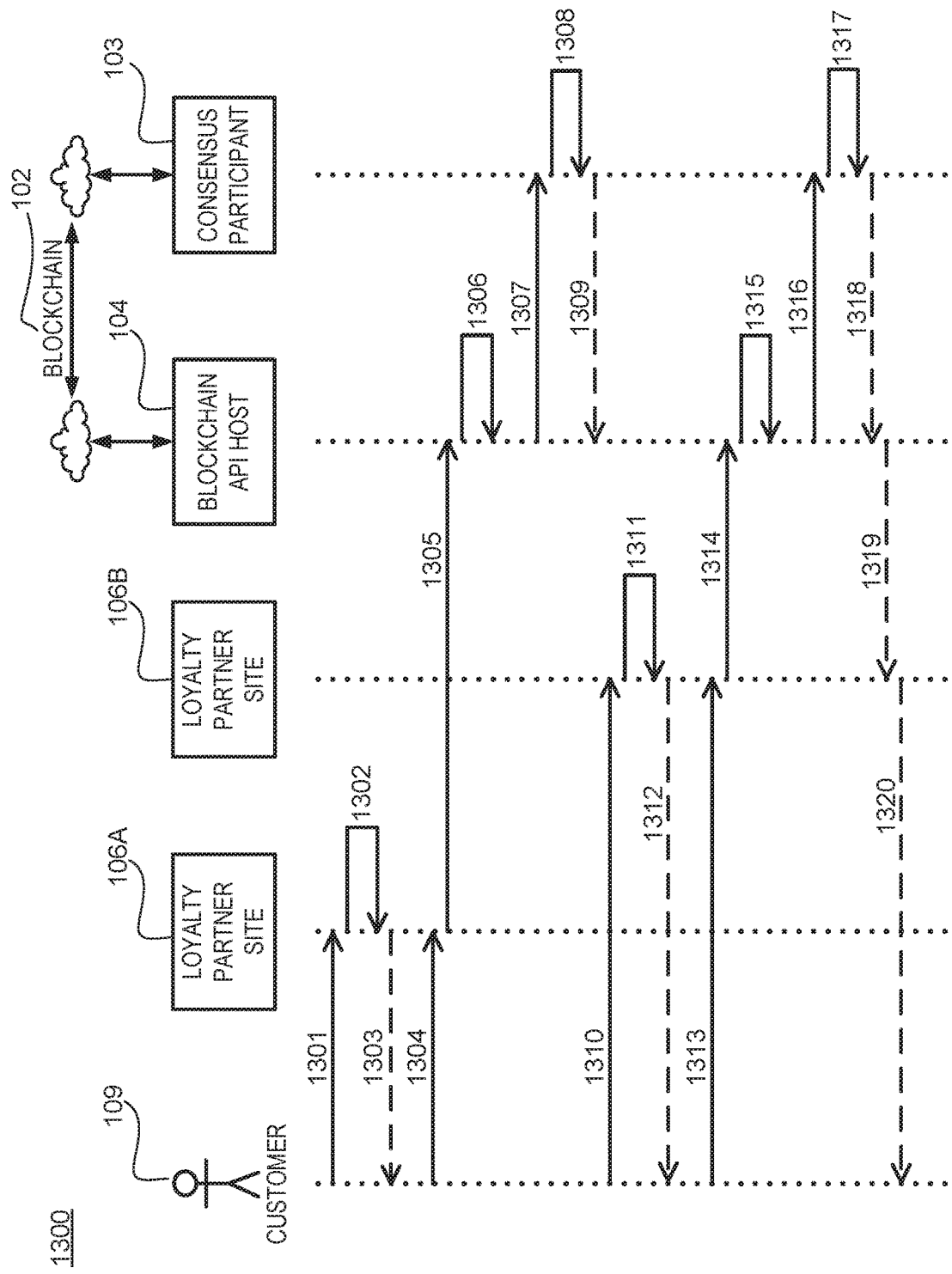
FIG. 13 illustrates a process for customer-completion of the multi-merchant loyalty point partnership, in accordance with various embodiments.

Referring now to FIGS. 11-13 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 11-13, but also to the various system components as described above with reference to FIG. 10. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the figures and described below.

With specific reference to FIG. 11, and in accordance with various embodiments, a process 1100 for generating a multi-merchant loyalty point partnership arrangement is disclosed. A loyalty partner (e.g., a first merchant) may generate the multi-merchant loyalty point partnership construct to specify various desired parameters of the partnership, as discussed further herein. The loyalty partner may preregister with the system as a loyalty coalition member (e.g., process 700, with brief reference to FIG. 7). In various embodiments, the multi-merchant loyalty point partnership construct may comprise a smart contract (e.g., a partnership smart contract) configured to control end-to-end data flows (or any portion thereof) in the system based on the various specified parameters.

In various embodiments, the loyalty partner (e.g., via loyalty partner site 106) accesses loyalty portal 1040 (Step 1101). Access to loyalty portal 1040 may be controlled using any suitable access control, such as, for example, loyalty partner credentials (e.g., username, password, biometric input, etc.), one time passwords, or the like. The loyalty partner may access loyalty portal 1040 to initiate the generation of a partnership smart contract (e.g., by interacting with a user interface (UI)). For example, the loyalty partner may initiate the generation of the partnership smart contract by selecting and/or inputting various desired partnership parameters such as, for example, the number of partners in the partnership (e.g., an exact number, a minimum number, a maximum number, a varying number based on certain factors, etc.), desired partnership industries (e.g., travel, hotel, etc.), or the like. In response to the loyalty partner initiating the generation, loyalty portal 1040 retrieves a partnership smart contract template (Step 1102) from the local contract repository. Loyalty portal 1040 returns the partnership smart contract template (Step 1103) to the loyalty partner (e.g., via loyalty partner site 106).

In response to receiving the partnership smart contract template, the loyalty partner may input and/or select various partnership parameters to be included in the partnership smart contract. For example, partnership parameters may include qualifying participant parameters, purchase requirement parameters, SKU-based rewards (as set forth herein), purchase reward parameters, partnership duration parameters, or the like. The qualifying participant parameters may comprise data corresponding to desired loyalty partner participants such as, for example, a partner identifier (e.g., blockchain address, ID, etc.), a partner industry category (e.g., travel), a partner industry subcategory (e.g., hotel), a partner reputation requirement (e.g., based on a reputation ledger, YELP® reviews, GOOGLE® reviews, a Better Business Bureau (BBB®) accreditation, etc.), a partner history (e.g., length of existence in loyalty point network 100, length of loyalty partner business existence, etc.), a partner geographic location (e.g., United States, New York, N.Y. City, etc.), or the like. The purchase requirement parameters may comprise data corresponding to the goods or services that need to be purchased at each loyalty partner to complete at least a portion of the partnership smart contract. The purchase requirement parameters may define the purchase requirements for each individual loyalty partner in the partnership, or may define collective requirements (a subset or all of the partners). For example, the purchase requirement parameters may comprise a good or service type, a geographic restriction (e.g., all purchases must be completed within New York City), a purchase amount (e.g., a minimum purchase amount), or the like. The purchase reward parameters may define the payout or reward a customer earns in response to completing the partnership smart contract. For example, the purchase reward parameters may comprise a partner discount (e.g., a future discount at one or more of the loyalty partners, a retroactive discount at one or more of the loyalty partners, etc.), a loyalty point payout (e.g., 500 loyalty points), a loyalty partner credit (e.g., a credit applied to the customer's transaction account), or the like. The partnership duration parameter may define the duration of the partnership smart contract, such as, for example, a time period, an expiration date, a maximum number of completed contracts, or the like.

The various partnership parameters may be input into the partnership smart contract template to generate the partnership smart contract. In various embodiments, the loyalty partner requests creation of the partnership smart contract with blockchain API host 104 (Step 1104). For example, the loyalty partner (via loyalty partner site 106) may invoke blockchain API host 104 by transmitting the partnership smart contract to blockchain API host 104. In response to being invoked, blockchain API host 104 propagates the partnership smart contract to consensus participants 103 (Step 1105) by transmitting the partnership smart contract to consensus participants 103 and/or by writing the partnership smart contract to blockchain 102. In various embodiments, the partnership smart contract write may also comprise data regarding the loyalty partner (e.g., as the first loyalty partner in the partnership), such as, for example, a partner identifier or the like.

Consensus participants 103 achieve consensus and add the partnership smart contract to blockchain 102 (Step 1106). Consensus participants 103 may achieve consensus using proof of work, proof of stake, practical byzantine fault tolerance, delegated proof of stake, or other suitable consensus algorithm. Consensus participants 103 may write the partnership smart contract to blockchain 102 using any suitable technique. In response to achieving consensus and completing the write, consensus participants 103 transmit a write confirmation to blockchain API host 104 (Step 1107). The write confirmation may comprise data indicating that the partnership smart contract was successfully written to blockchain 102. In various embodiments, the write confirmation may also comprise data pointing to the location of the write on blockchain 102, such as a uniform resource locator (URL), or the like. In response to receiving the write confirmation, blockchain API host 104 transmits the write confirmation to the loyalty partner (Step 1108), such as, for example, via loyalty partner site 106.

The loyalty partner (e.g., via loyalty partner site 106) requests participant notification with loyalty portal 1040 (Step 1109), based on the partnership parameters of the partnership smart contract. For example, the loyalty partner, via loyalty partner site 106, may transmit the partnership parameters and/or the partnership smart contract to loyalty portal 1040. Loyalty portal 1040 retrieves qualifying participant data from local partner repository (Step 1110), based on the partnership parameters and/or the partnership smart contract. For example, the local partner repository may store participant data for each loyalty partner in the system. The participant data may comprise data corresponding to each local partner, including partner characteristics, partner preferences, or the like. For example, partner characteristics may comprise the partner identifier, the partner industry category, the partner industry subcategory, a partner reputation, the partner history, the partner geographic, the partner goods or services sold, or the like. The partner preferences may comprise data regarding partnerships the loyalty partner desires to join, such as, for example, the type of purchase reward (e.g., partner discount, loyalty point payout, loyalty partner credit, etc.), the partnership duration, the purchase amount, or the like. The participant data may be grouped by each partner identifier.

In that regard, loyalty portal 1040 may locate one or more loyalty partners comprising participant data that at least partially matches the partnership parameters. Loyalty portal 1040 broadcasts a partnership notification to qualifying participants (Step 1111). The partnership notification may comprise data corresponding to the partnership smart contract, such as, for example, a blockchain URL (e.g., the location of the partnership smart contract in blockchain 102), the partnership parameters, or the like. In various embodiments, loyalty portal 1040 may also broadcast the partnership notification to all participants in the system.

With specific reference to FIG. 12, and in accordance with various embodiments, a process 1200 for enrolling a partner in a multi-merchant loyalty point partnership is disclosed. A loyalty partner may desire to enroll in one or more multi-merchant loyalty point partnership. The loyalty partner (e.g., via loyalty partner site 106) requests active partnership smart contracts from loyalty portal 1040 (Step 1201). For example, the loyalty partner may request one or more active partnership smart contracts in response to receiving the partnership notification in Step 1111. As a further example, the loyalty partner may request the active partnership smart contracts to browse and review various available and active partnership smart contracts. In that regard, the request may comprise a request for a specific partnership smart contract (e.g., based on the blockchain URL) or a general request for one or more active partnership smart contracts.

In response to receiving the request, loyalty portal 1040 retrieves partner data from local partner repository (Step 1202) corresponding to the loyalty partner. For example, loyalty portal 1040 may retrieve the partner data based on the partner identifier. Loyalty portal 1040 invokes blockchain API host 104 (Step 1204) to return qualifying active partnership smart contracts. For example, loyalty portal 1040 may invoke blockchain API host 104 by transmitting the partner data to blockchain API host 104. In various embodiments, loyalty portal 1040 may also invoke blockchain API host 104 by transmitting the blockchain URL. In response to being invoked, blockchain API host 104 retrieves and returns qualifying active partnership smart contracts to the loyalty partner (e.g., via loyalty partner site 106) (Step 1205).

In that regard, and in accordance with various embodiments, blockchain API host 104 may retrieve the specific partnership smart contract based on the blockchain URL. In various embodiments, blockchain API host 104 may also retrieve one or more active partnership smart contracts based on the partner data. For example, blockchain API host 104 may retrieve partnership smart contracts having partnership parameters that at least partially match the partner data retrieved in Step 1202. Blockchain API host 104 may return the one or more partnership smart contracts to the loyalty partner, via loyalty partner site 106.

In response to receiving the partnership smart contracts, the loyalty partner may review the partnership smart contracts to determine whether the loyalty partner desires to enroll in one or more partnership smart contracts. The loyalty partner (e.g., via loyalty partner site 106) invokes blockchain API host 104 by transmitting a partnership enrollment request (Step 1206). The partnership enrollment request may comprise data indicating the partnership smart contract that the loyalty partner desires to enroll in (e.g., by blockchain URL, smart contract ID, etc.), partner data (e.g., a partner identifier, etc.), or the like. In response to being invoked, blockchain API host 104 propagates the partnership enrollment request to consensus participants 103 (Step 1207) by transmitting the partnership enrollment request to consensus participants 103 and/or by writing the enrollment request to blockchain 102.

Consensus participants 103 achieve consensus and add the enrollment request to blockchain 102 (Step 1208). Consensus participants 103 may achieve consensus using proof of work, proof of stake, practical byzantine fault tolerance, delegated proof of stake, or other suitable consensus algorithm. Consensus participants 103 may write the partnership smart contract to blockchain 102 using any suitable technique. In response to achieving consensus and completing the write, consensus participants 103 transmit an update write confirmation to blockchain API host 104 (Step 1209).

In response to the partnership smart contract completing loyalty partner enrollment (e.g., in response to the specified number of partners in the partnership being met), the partnership smart contract may mark the partnership as active.

With specific reference to FIG. 13, and in accordance with various embodiments, a process 1300 for customer-completion of a multi-merchant loyalty point partnership is disclosed. In various embodiments, customer 109 may be aware of the loyalty point partnership prior to shopping at the loyalty partners. For example, the loyalty point partnership may be advertised, customer 109 may be directly notified, or the like. In various embodiments, customer 109 may be unaware of the loyalty point partnership prior to shopping at the loyalty partners. In that regard, customer 109 may still receive the purchase reward (e.g., partner discount, loyalty point payout, loyalty partner credit, etc.), in response to completing the requirements of the loyalty point partnership.

Customer 109 shops with a first loyalty partner by browsing loyalty partner site 106A (Step 1301). For example, customer 109 may browse loyalty partner site to select one or more products or services. Loyalty partner site 106A retrieves product data (Step 1302) based on customer 109 selections. Customer 109 may continue to select product and/or services, or may proceed with the checkout process. In response to customer 109 initiating the checkout process, loyalty partner site 106A may prompt customer 109 to select a payment method, such as, for example, using a transaction account, customer loyalty points, gift cards, or any other suitable payment type. In response to customer 109 selecting loyalty points, loyalty partner site 106A prompts customer 109, and/or loyalty wallet 105, for the corresponding loyalty account at checkout (Step 1303). The loyalty account may be identifiable by a universally unique identifier (UUID), for example. Customer 109 provides the loyalty account (Step 1304) in response to the prompt by entering the loyalty account and/or by loyalty wallet 105 transmitting the loyalty account. Customer 109 may also input or select various payment information and preferences, such as, for example, shipping information, billing information, or the like. In response to customer 109 inputting and/or selecting various payment preferences, loyalty partner site 106A may communicate with bank settlement system 1020 to authorize, settle, and/or complete the transaction.

In response to completing the purchase, loyalty partner site 106A invokes blockchain API host 104 (step 1305) by transmitting the loyalty account and/or transaction data (e.g., products or services purchased, transaction total, etc.). In various embodiments, access to blockchain API host 104 may be provided to each loyalty partner by an independent cloud service provider offering blockchain as a service (BaaS) functionality (e.g., via a paid service subscription or the like). In response to being invoked, blockchain API host 104 executes the partner smart contract. The partner smart contract may validate whether the transaction data from the completed purchase meets the various partnership parameters. In response to the transaction data qualifying, the partner smart contract records the transaction (step 1306). For example, the partner smart contract records the loyalty account, and a tag, note, or the like indicating that a qualifying purchase was completed with the loyalty account. In response to customer 109 selecting to at least partially complete the purchase using loyalty points, partner smart contract may also adjust the loyalty point balance (see step 305 of FIG. 3).

Blockchain API host 104 propagates the transaction record write to consensus participants 103 by transmitting the transaction record write to consensus participants 103 and/or by writing the transaction record write to blockchain 102 (step 1307). Consensus participants 103 achieve consensus and add the transaction record to the blockchain 102 (Step 1308). Consensus participants 103 may achieve consensus using proof of work, proof of stake, practical byzantine fault tolerance, delegated proof of stake, or other suitable consensus algorithm. Consensus participants 103 may write the transaction record to blockchain 102 using any suitable technique. In response to achieving consensus and completing the write, consensus participants 103 transmit a transaction record confirmation to blockchain API host 104 (step 1309). The transaction record confirmation may comprise data indicating that the transaction record was successfully written to blockchain 102. In various embodiments, the transaction record confirmation may also comprise data pointing to the location of the write on blockchain 102, such as a uniform resource locator (URL), or the like. Consensus participants 103 may also notify customer 109 of the completed loyalty point balance adjustment.

In various embodiments, customer 109 shops with a second loyalty partner by browsing loyalty partner site 106B (Step 1310). The second loyalty partner may be a second partner in the partnership smart contract. For example, customer 109 may browse loyalty partner site 106B to select one or more products or services. Loyalty partner site 106B retrieves product data (step 1311) based on customer 109 selections. Customer 109 may continue to select product and/or services, or may proceed with the checkout process. In response to customer 109 initiating the checkout process, loyalty partner site 106B may prompt customer 109 to select a payment method, such as, for example, using a transaction account, customer loyalty points, gift cards, or any other suitable payment type. In response to customer 109 selecting loyalty points, loyalty partner site 106B prompts customer 109, and/or loyalty wallet 105, for the corresponding loyalty account at checkout (Step 1312). Customer 109 provides the loyalty account (Step 1313) in response to the prompt by entering the loyalty account and/or by loyalty wallet 105 transmitting the loyalty account. Customer 109 may also input or select various payment information and preferences, such as, for example, shipping information, billing information, or the like. In response to customer 109 inputting and/or selecting various payment preferences, loyalty partner site 106B may communicate with bank settlement system 1020 to authorize, settle, and/or complete the transaction.

In response to completing the purchase, loyalty partner site 106B invokes blockchain API host 104 (Step 1314) by transmitting the loyalty account and/or transaction data (e.g., products or services purchased, transaction total, etc.). In response to being invoked, blockchain API host 104 executes the partner smart contract. The partner smart contract may validate whether the transaction data from the completed purchase meets the various partnership parameters. In response to the transaction data qualifying, the partner smart contract records the transaction (step 1315). For example, the partner smart contract records the loyalty account, and a tag, note, or the like indicating that a qualifying purchase was completed with the loyalty account. In response to customer 109 selecting to at least partially complete the purchase using loyalty points, partner smart contract may also adjust the loyalty point balance (see step 305 of FIG. 3). Consensus participants 103 may also notify customer 109 of the completed loyalty point balance adjustment.

Blockchain API host 104 propagates the transaction record write to consensus participants 103 by transmitting the transaction record write to consensus participants 103 and/or by writing the transaction record write to blockchain 102 (Step 1316). Consensus participants 103 achieve consensus and add the transaction record to the blockchain 102 (Step 1317). Consensus participants 103 may achieve consensus using proof of work, proof of stake, practical byzantine fault tolerance, delegated proof of stake, or other suitable consensus algorithm. Consensus participants 103 may write the transaction record to blockchain 102 using any suitable technique. In response to achieving consensus and completing the write, consensus participants 103 transmit a transaction record confirmation to blockchain API host 104 (step 1318). The transaction record confirmation may comprise data indicating that the transaction record was successfully written to blockchain 102. In various embodiments, the transaction record confirmation may also comprise data pointing to the location of the write on blockchain 102, such as a uniform resource locator (URL), or the like. Consensus participants 103 may also notify customer 109 of the completed loyalty point balance adjustment.

In various embodiments, in response to receiving the transaction record confirmation, blockchain API host 104 may execute the partner smart contract to update the loyalty account corresponding to customer 109 in the partnership smart contract. The partner smart contract may determine that customer 109 has completed the requirements of the partnership parameters, such as, for example in response to customer 109 completing a qualifying purchase at each of the loyalty partners partnered in the partner smart contract. In response to the purchase reward being a loyalty point payout, blockchain API host 104 may adjust the loyalty point balance of customer 109 using any suitable technique, such as, for example using process 300, with brief reference to FIG. 3. Blockchain API host 104 transmits the transaction record confirmation and/or a partnership completion notification to loyalty partner site 106B (Step 1319). The partnership completion notification may comprise data corresponding to the purchase reward, and/or any other suitable data regarding the completion of the partnership.

Loyalty partner site 106B notifies customer 109 of completion of the multi-merchant loyalty point partnership (Step 1320). In response to the purchase reward being the loyalty point payout, the customer notification may also comprise the loyalty point payout amount and the completed balance adjustment. In response to the purchase reward being a partner discount or a loyalty partner credit, the customer notification may comprise data indicating the amount of the partner discount or the loyalty partner credit.

In various embodiments, auditor 1030 may be granted access to blockchain 102 (and/or to an audit log of writes to blockchain 102). Auditor 1030 may be configured to access and retrieve the writes, such as, for example, by migrating the data to a dedicating audit database. Auditor 1030 may perform various analytical processing on the data as required by desired or suitable auditing needs.

The systems and processes described herein improve the functioning of the computer by propagating loyalty point data quickly and immutably, and enabling multi-merchant loyalty point partnerships. For example, by the user may simply request a transaction using stored blockchain keys and account numbers as opposed to manually inputting data, the user performs less computer functions and provides less input, which saves on data storage and memory which speeds processing. Additionally, by transmitting, storing, and accessing data using the processes described herein, the security of the data is improved, which decreases the risk of the computer or network from being compromised. Use of blockchain 102 ensures integrity and immutability of communications in such way that neither of the interacting parties have to rely on a specific entity to maintain the state of the ledger. The use of blockchain 102 may also enable full transparency. Since all participants in effect maintain a single ledger, consistency may be maintained between various blockchain nodes. The complexity of the system is also reduced by alleviating the use of offline and/or batch processes typically used to keep multiple systems in sync. Further, by syncing data with the involved parties in real time (or near real time), the system may improve data integrity, data confidentiality, and data security, which may also improve the speed of the business process. The system may also reduce database synchronization errors by providing a common data structure, thus at least partially improving the integrity of stored data.

Data transfers performed through the system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times and the speed of transferring data, initiating purchases, and completing purchases in the system may be improved compared to existing systems, and implementation costs and time to market may also be drastically reduced.

In various embodiments, the system also offers increased reliability and fault tolerance over traditional databases (e.g., relational databases, distributed databases, etc.) as each node may operate with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, and U.S. application Ser. No. 16/012,598 titled BUYER-CENTRIC MARKETPLACE USING BLOCKCHAIN and filed on Jun. 19, 2018, the contents of which are each incorporated by reference in its entirety.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

Phrases and terms similar to "account," "account number," "account code," or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The phrases "consumer," "customer," "user," "account holder," "account affiliate," "cardmember," or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, a Personal Computer Memory Card International Association (PCMCIA) slot and card, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

In various embodiments, components, modules, and/or engines of loyalty point network 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The systems, computers, computer based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT' Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS' operating systems).

Users, systems, computer based systems or the like may communicate with the server via a web client. The web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any database discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces such as for example REACHJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
receiving, by a loyalty point network that comprises a host computing server and a loyalty portal service, from a first loyalty partner website a request to create a partnership smart contract, wherein the request comprises a purchase requirement parameter and a reward parameter, the host computing server providing an application programming interface (API) for a blockchain network, the loyalty portal service being in data communication with the host computing server;
transmitting, by the host computing server, a contract request to consensus participant devices for writing to the blockchain network, wherein the blockchain network comprises a plurality of computing devices that maintain a distributed ledger over a peer-to-peer network, wherein the contract request comprises the partnership smart contract;
transmitting, by the host computing server, a write confirmation to the first loyalty partner website, wherein the write confirmation indicates that the contract request was stored in the blockchain network;
receiving, by the loyalty portal service, a participant notification request from the first loyalty partner website, wherein the participant notification request comprises a partnership parameter of the partnership smart contract;
selecting, by the loyalty portal service, a second loyalty partner website in response to the participant notification request based at least in part on a type of purchase reward for a loyalty point account associated with the second loyalty partner website meeting the partnership parameter from the partnership smart contract, wherein the type of purchase reward is accessed from the loyalty portal service;
transmitting, by the loyalty portal service, a partnership notification to the second loyalty partner website, wherein the partnership notification comprises a blockchain uniform resource locator (URL) for locating the partnership smart contract in the blockchain network;
receiving, by the host computing server, a smart contract request from the second loyalty partner website, the smart contract request comprising the blockchain URL;
transmitting, by the host computing server, the partnership smart contract to the second loyalty partner website based at least in part on the blockchain URL being included in the smart contract request; and
executing, by the host computing server, the partnership smart contract to validate that a first transaction meets the purchase requirement parameter, the first transaction being received from the second loyalty partner website, wherein the execution of the partnership smart contract authorizes an adjustment of a balance for the loyalty point account of a customer in the blockchain network based at least in part on the reward parameter.

2. The method of claim 1, further comprising:
receiving, by the host computing server, a respective request for an active partnership smart contract, wherein the respective request comprises loyalty partner data;
retrieving, by the host computing server, the active partnership smart contract by comparing at least one of the purchase requirement parameter or the reward parameter of the active partnership smart contract with the loyalty partner data; and
returning, by the host computing server, the active partnership smart contract to a respective one of a plurality of loyalty partner websites.

3. The method of claim 1, further comprising:
receiving, by the host computing server, a partnership enrollment request for a respective one of a plurality of loyalty partner websites, wherein the partnership enrollment request comprises loyalty partner data and a partnership smart contract identifier; and
transmitting, by the host computing server, the partnership enrollment request to the consensus participant devices for writing to the blockchain network, wherein in response to receiving the partnership enrollment request the consensus participant devices achieve consensus on the partnership enrollment request.

4. The method of claim 1, further comprising:
transmitting, by the host computing server, a first transaction record write to the consensus participant devices for writing to the blockchain network based at least in part on the execution of the partnership smart contract for the first transaction, wherein in response to receiving the first transaction record write the consensus participant devices achieve consensus on the first transaction record write.

5. The method of claim 4, further comprising:
executing, by the host computing server, the partnership smart contract in response to being invoked by a third loyalty partner website, wherein the third loyalty partner website invokes the host computing server in response to completing a second transaction, and wherein in response to being executed the partnership smart contract records the second transaction; and
transmitting, by the host computing server, a second transaction record write to the consensus participant devices for writing to the blockchain network, wherein in response to receiving the second transaction record write the consensus participant devices achieve consensus on the second transaction record write.

6. The method of claim 5, wherein in response to being executed the partnership smart contract determines that the first transaction and the second transaction complete the purchase requirement parameter of the partnership smart contract.

7. The method of claim 6, wherein in response to a purchase reward of the partnership smart contract being a loyalty point payout the partnership smart contract instructs the host computing server to adjust the balance of the loyalty point account of the customer based at least in part on the loyalty point payout.

8. The method of claim 1, wherein the loyalty portal service comprises a contract repository for storing a plurality of partnership smart contract templates, the partnership smart contract is generated based at least in part on one of the plurality of partnership smart contract templates, and the loyalty portal service is accessible via a user interface.

9. A loyalty point network, comprising:
a computing device; and
a tangible, non-transitory memory configured to communicate with the computing device, the tangible, non-transitory memory having instructions stored thereon that, in response to execution by the computing device, cause the computing device to at least:
receive from a first loyalty partner website a request to create a partnership smart contract, wherein the request comprises a purchase requirement parameter and a reward parameter;
transmit a contract request to consensus participant devices for writing to a blockchain network, wherein the blockchain network comprises a plurality of computing devices that maintain a distributed ledger over a peer-to-peer network, the contract request comprises the partnership smart contract;
transmit a write confirmation to the first loyalty partner website, wherein the write confirmation indicates that the contract request was stored in the blockchain network;
receive a participant notification request from the first loyalty partner website, wherein the participant notification request comprises a partnership parameter of the partnership smart contract;
select a second loyalty partner website in response to the participant notification request based at least in part on a type of purchase reward for a loyalty point account associated with the second loyalty partner website meeting the partnership parameter from the partnership smart contract, wherein the type of purchase reward is accessed from a loyalty portal service;
transmit a partnership notification to the second loyalty partner website, wherein the partnership notification comprises a blockchain uniform resource locator (URL) for accessing the partnership smart contract in the blockchain network;
receive a smart contract request from the second loyalty partner website, the smart contract request comprising the blockchain URL;
transmit the partnership smart contract to the second loyalty partner website based at least in part on the blockchain URL being included in the smart contract request; and
execute the partnership smart contract to validate that a first transaction meets the purchase requirement parameter, the first transaction being received from the second loyalty partner website, wherein the execution of the partnership smart contract authorizes an adjustment of a balance of the loyalty point account of a customer in the blockchain network based at least in part on the reward parameter.

10. The loyalty point network of claim 9, wherein the instructions, in response to execution by the computing device, cause the computing device to at least:
receive a request for an active partnership smart contract, wherein the request comprises loyalty partner data;
retrieve the active partnership smart contract by comparing the purchase requirement parameter or the reward parameter of the active partnership smart contract with the loyalty partner data; and
return the active partnership smart contract to a respective one of a plurality of loyalty partner websites.

11. The loyalty point network of claim 9, wherein the instructions, in response to execution by the computing device, cause the computing device to at least:
receive a partnership enrollment request for a respective one of a plurality of loyalty partner websites, wherein the partnership enrollment request comprises loyalty partner data and a partnership smart contract identifier; and
transmit the partnership enrollment request to the consensus participant devices for writing to the blockchain network, wherein in response to receiving the partnership enrollment request the consensus participant devices are configured to achieve consensus on the partnership enrollment request.

12. The loyalty point network of claim 9, wherein the instructions, in response to execution by the computing device, cause the computing device to at least:
transmit a first transaction record write to the consensus participant devices for writing to the blockchain network based at least in part on the execution of the partnership smart contract for the first transaction, wherein in response to receiving the first transaction record write the consensus participant devices are configured to achieve consensus on the first transaction record write.

13. The loyalty point network of claim 12, wherein the instructions, in response to execution by the computing device, cause the computing device to at least:
execute the partnership smart contract in response to being invoked by a third loyalty partner website, wherein the third loyalty partner website is configured to invoke the computing device in response to completing a second transaction, and wherein in response to being executed the partnership smart contract is configured to record the second transaction; and
transmit a second transaction record write to the consensus participant devices for writing to the blockchain network, wherein in response to receiving the second transaction record write the consensus participant devices are configured to achieve consensus on the second transaction record write.

14. The loyalty point network of claim 13, wherein in response to being executed the partnership smart contract is configured to determine whether the first transaction and the second transaction complete the purchase requirement parameter of the partnership smart contract.

15. The loyalty point network of claim 14, wherein in response to a purchase reward of the partnership smart contract being a loyalty point payout the partnership smart contract is configured to instruct the computing device to adjust the balance of the loyalty point account based at least in part on the loyalty point payout.

16. An article of manufacture including a non-transitory, tangible computer readable storage medium having instructions stored thereon that, in response to execution by a computing device, cause the computing device to at least:
receive from a first loyalty partner website a request to create a partnership smart contract, wherein the request comprises a purchase requirement parameter and a reward parameter;

transmit a contract request to consensus participant devices for writing to a blockchain network, wherein the blockchain network comprises a plurality of computing devices that maintain a distributed ledger over a peer-to-peer network, wherein the contract request comprises the partnership smart contract;

transmit a write confirmation to the first loyalty partner website, wherein the write confirmation indicates that the contract request was stored in the blockchain network;

receive a participant notification request from the first loyalty partner website, wherein the participant notification request comprises a partnership parameter of the partnership smart contract;

select a second loyalty partner website based at least in part on a type of purchase reward for a loyalty point account associated with the second loyalty partner website meeting the partnership parameter from the partnership smart contract, wherein the type of purchase reward is accessed from a loyalty portal service;

transmit a partnership notification to the second loyalty partner website, wherein the partnership notification comprises a blockchain uniform resource locator (URL) for accessing data associated with the partnership smart contract in the blockchain network;

receive a smart contract request from the second loyalty partner website, the smart contract request comprising the blockchain URL;

transmit the partnership smart contract to the second loyalty partner website based at least in part on the blockchain URL being included in the smart contract request; and execute the partnership smart contract to validate that a first transaction meets the purchase requirement parameter, the first transaction being received from the second loyalty partner website, wherein the execution of the partnership smart contract authorizes an adjustment of a balance of the loyalty point account of a customer in the blockchain network based at least in part on the reward parameter.

17. The article of claim 16, wherein the instructions, in response to execution by the computing device, cause the computing device to at least:

transmit a first transaction record write to the consensus participant devices for writing to the blockchain network based at least in part on the execution of the partnership smart contract for the first transaction, wherein in response to receiving the first transaction record write the consensus participant devices are configured to achieve consensus on the first transaction record write.

18. The article of claim 17, wherein the instructions, in response to execution by the computing device, cause the computing device to at least:

execute the partnership smart contract in response to being invoked by a third loyalty partner website, wherein the third loyalty partner website is configured to invoke the computing device in response to completing a second transaction, and wherein in response to being executed the partnership smart contract is configured to record the second transaction; and transmit a second transaction record write to the consensus participant devices for writing to the blockchain network, wherein in response to receiving the second transaction record write the consensus participant devices are configured to achieve consensus on the second transaction record write.

19. The article of claim 18, wherein in response to being executed the partnership smart contract is configured to determine whether the first transaction and the second transaction complete the purchase requirement parameter of the partnership smart contract.

20. The article of claim 19, wherein in response to the reward parameter of the partnership smart contract being a loyalty point payout, the partnership smart contract is configured to instruct the computing device to adjust the balance of the loyalty point account balance based at least in part on the loyalty point payout.

* * * * *